Nov. 12, 1963

H. G. MOSS ETAL 3,110,182

COTTON SAMPLING APPARATUS

Filed Dec. 23, 1959

INVENTORS
HOYLE G. MOSS,
ROBERT C. SCHWARTZ and
THOMAS RICHARD ALLEN

BY Mason, Fenwick & Lawrence
ATTORNEYS

Nov. 12, 1963
H. G. MOSS ETAL
3,110,182
COTTON SAMPLING APPARATUS
Filed Dec. 23, 1959
9 Sheets-Sheet 2
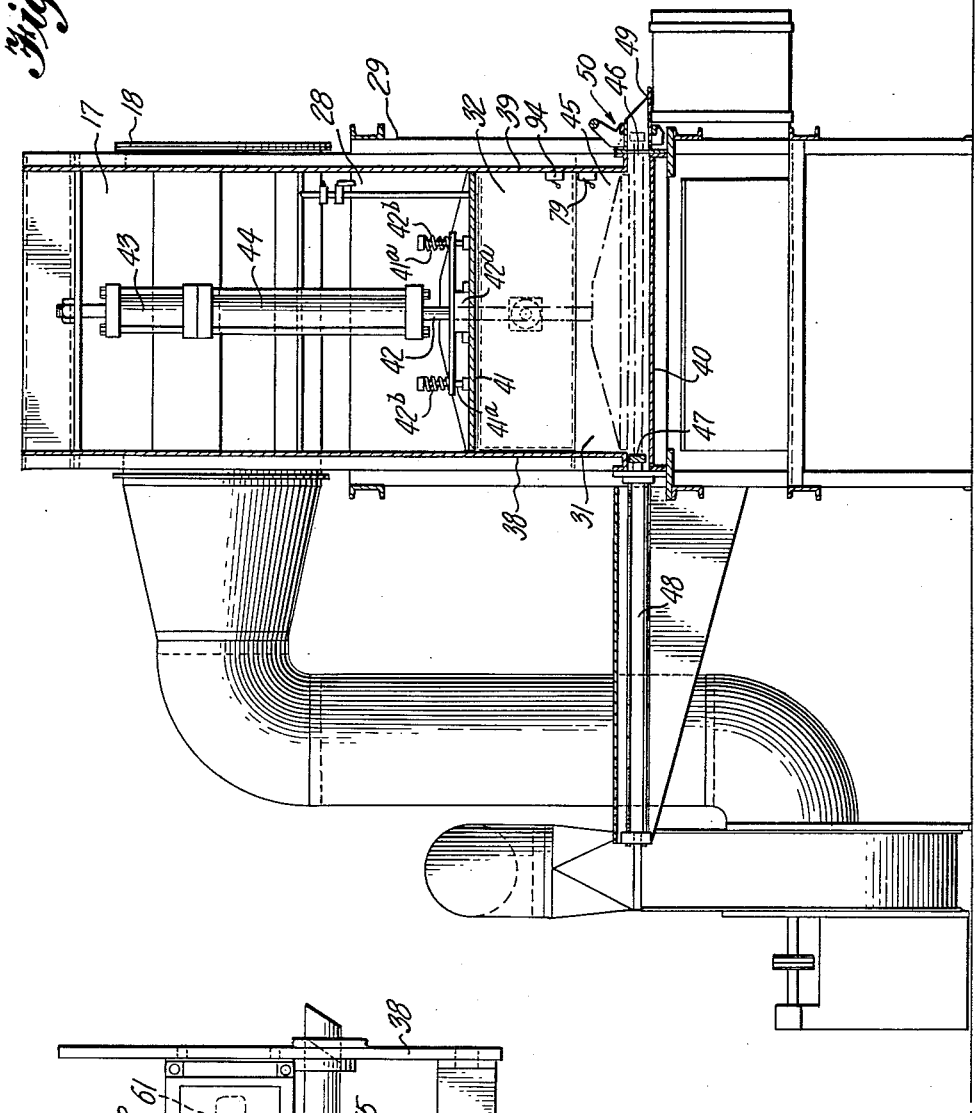
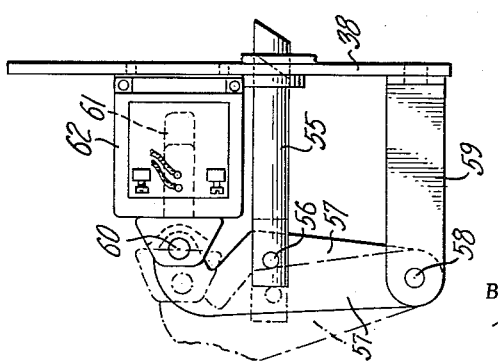
INVENTORS
HOYLE G. MOSS,
ROBERT C. SCHWARTZ and
THOMAS RICHARD ALLEN
BY Mason, Fenwick, & Lawrence
ATTORNEYS

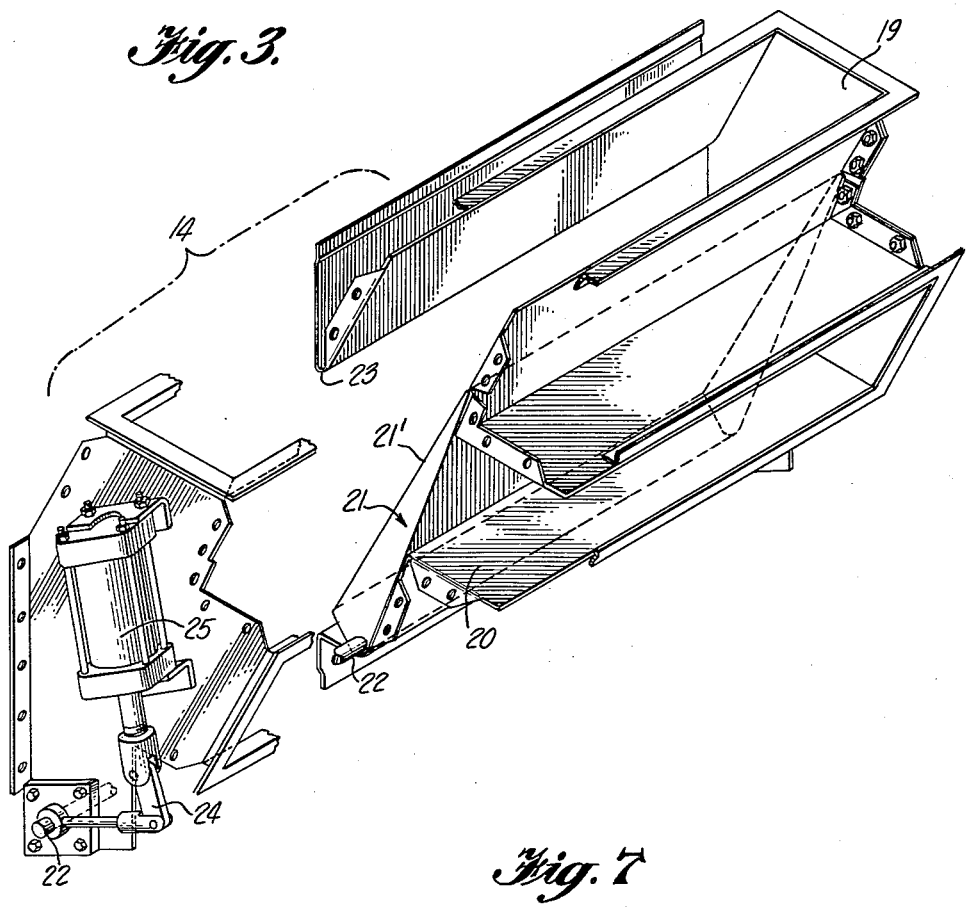
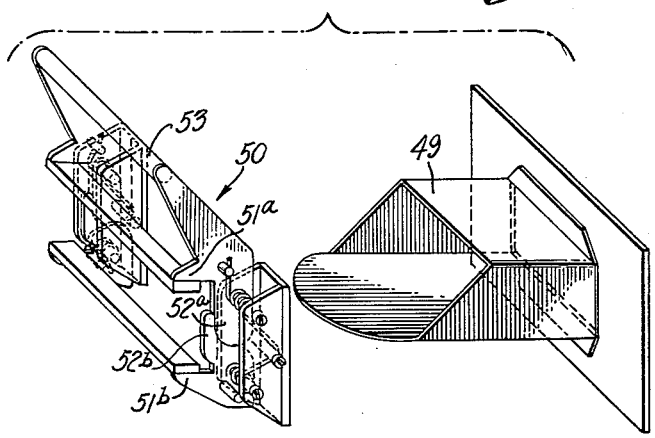

Nov. 12, 1963
H. G. MOSS ETAL
3,110,182
COTTON SAMPLING APPARATUS
Filed Dec. 23, 1959
9 Sheets-Sheet 4
Fig. 6.
Fig. 5.
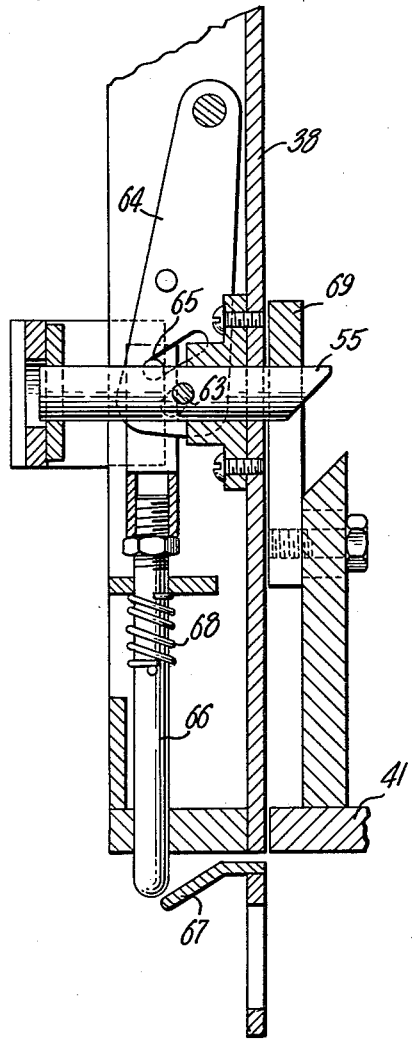
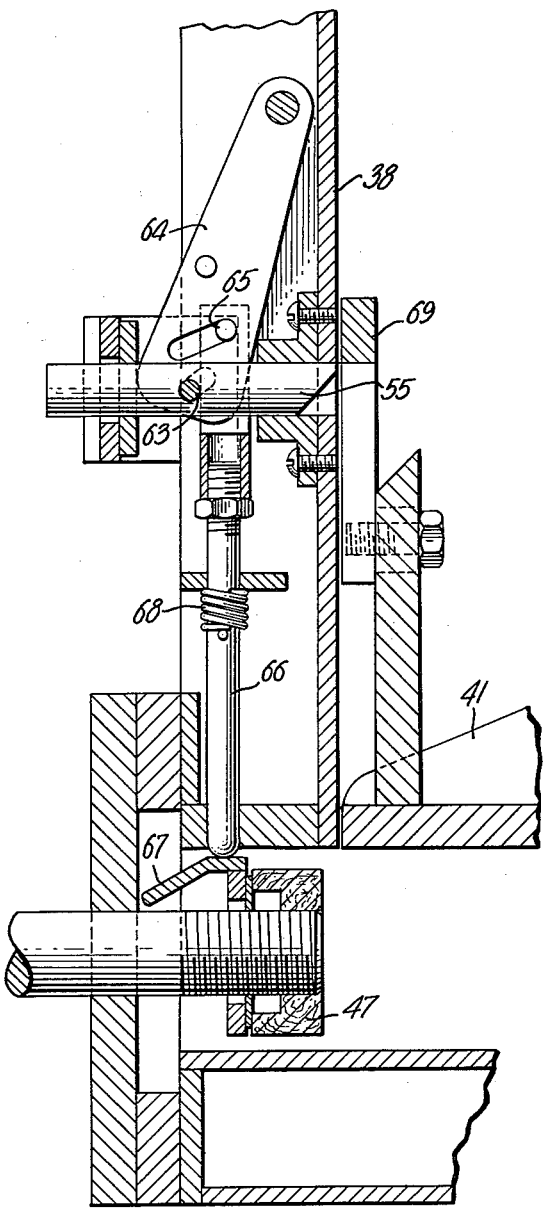
INVENTORS
HOYLE G. MOSS,
ROBERT C. SCHWARTZ and
THOMAS RICHARD ALLEN
BY Mason, Fenwick & Lawrence
ATTORNEYS

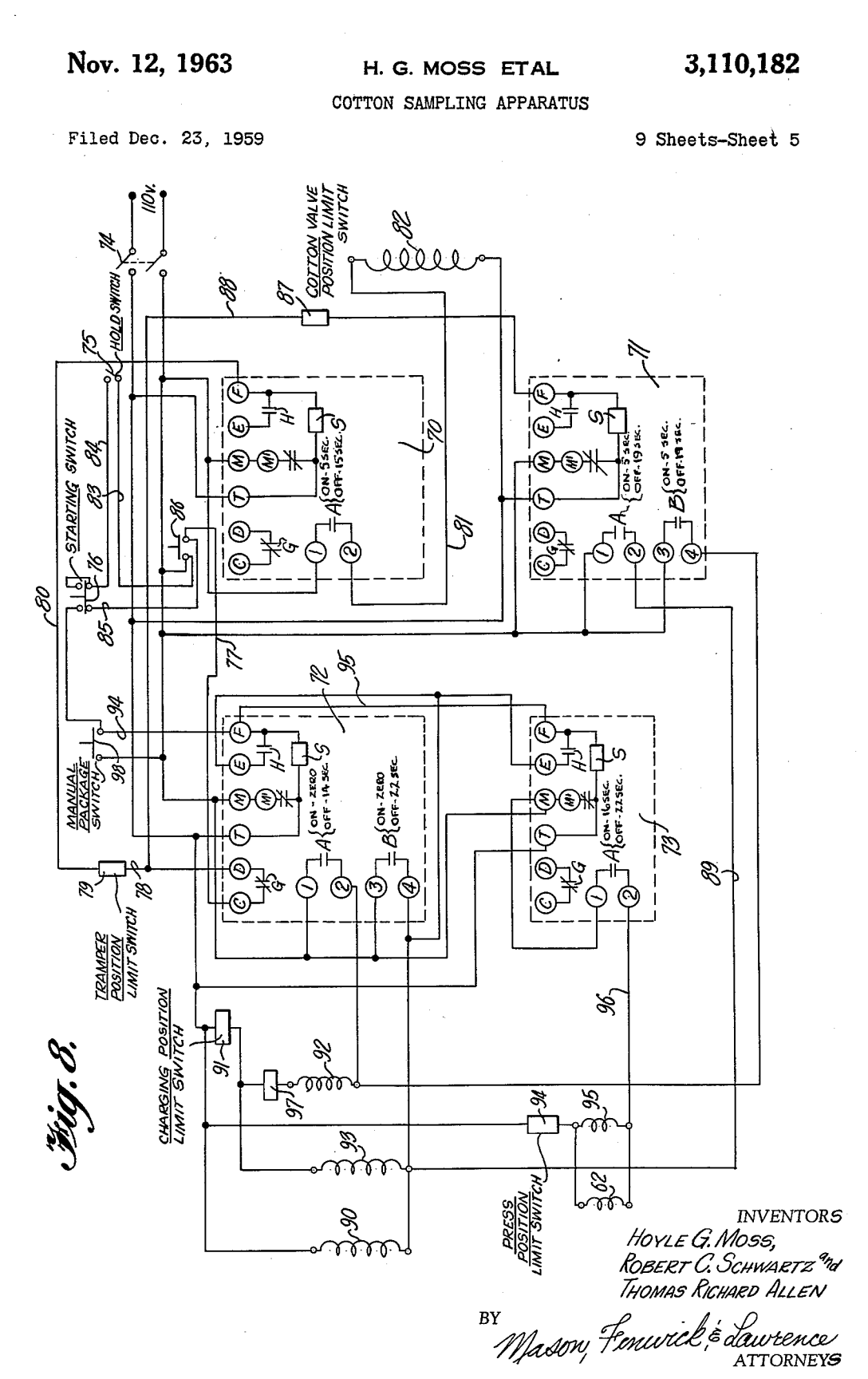

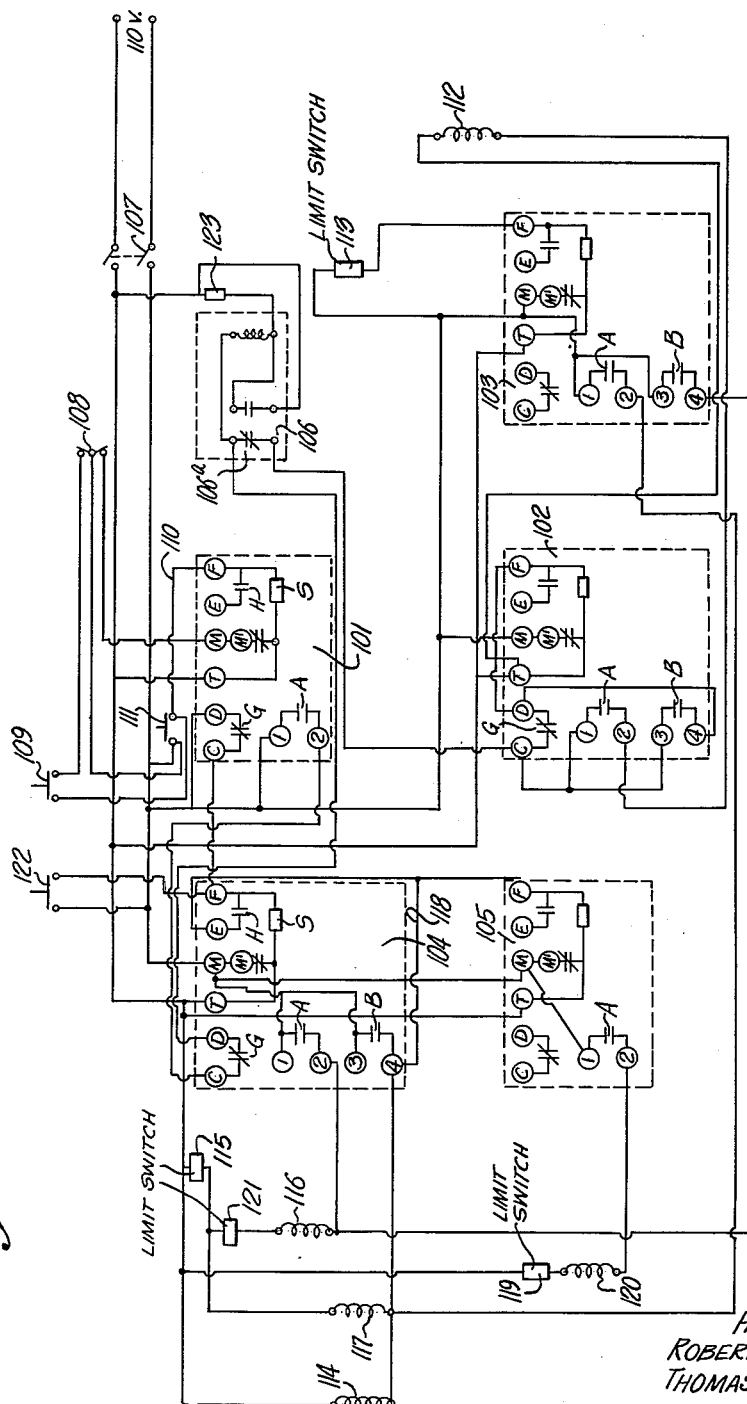

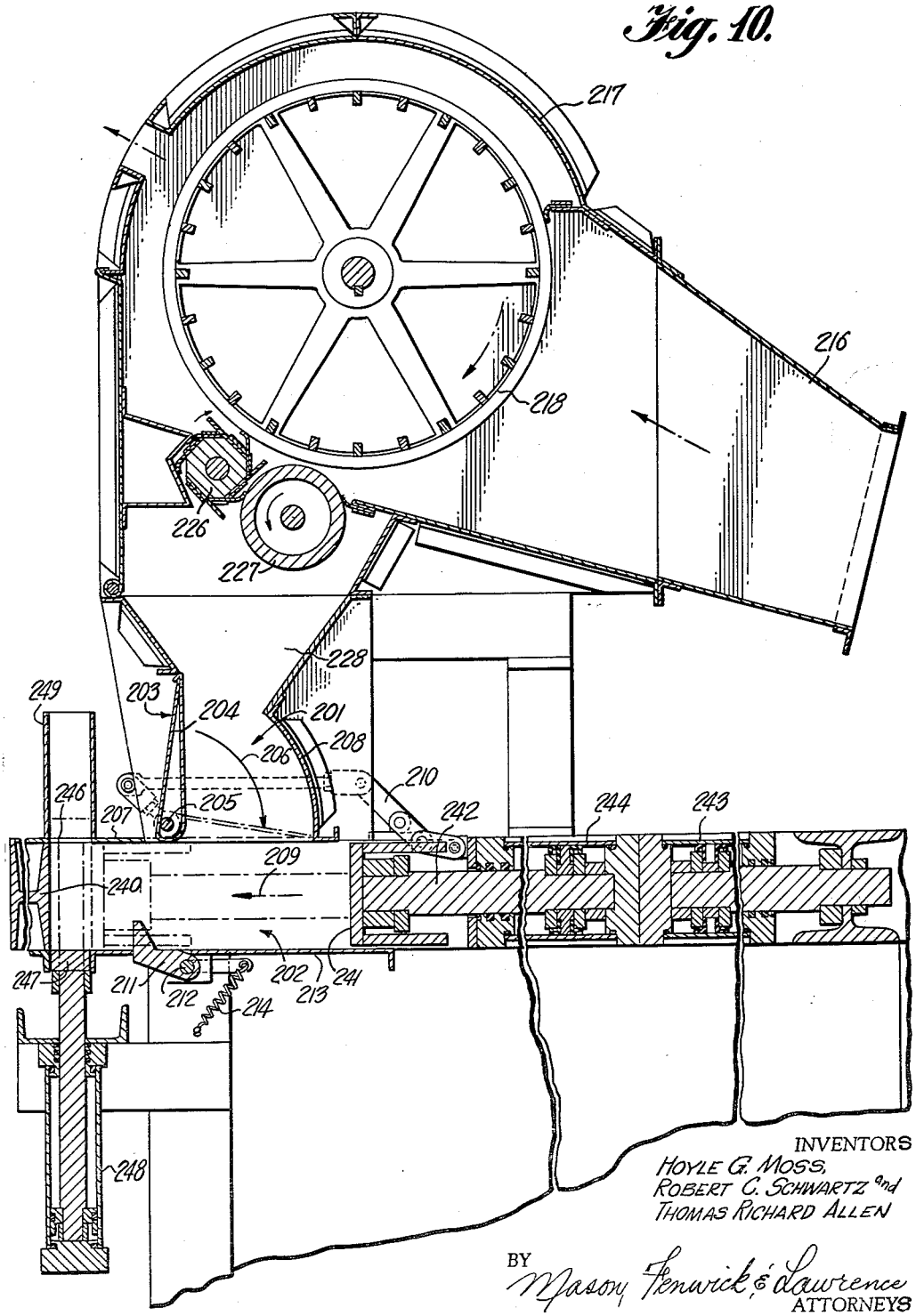

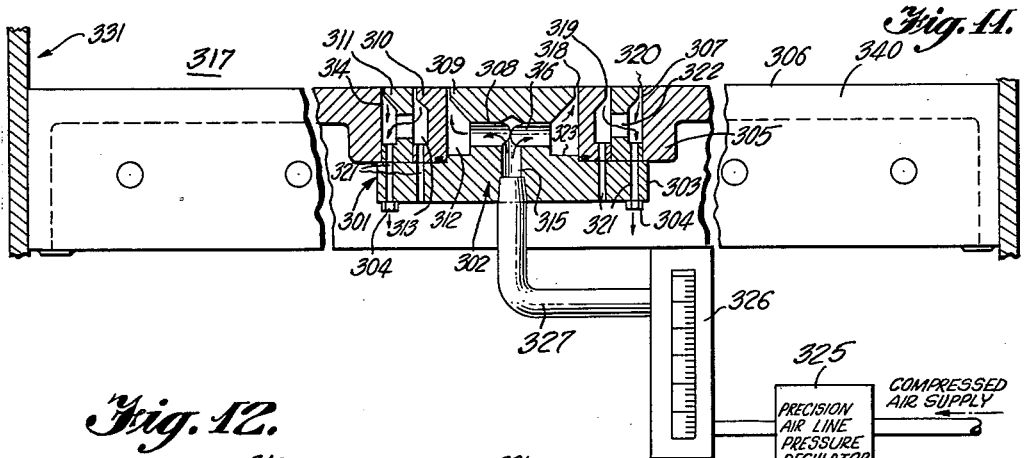
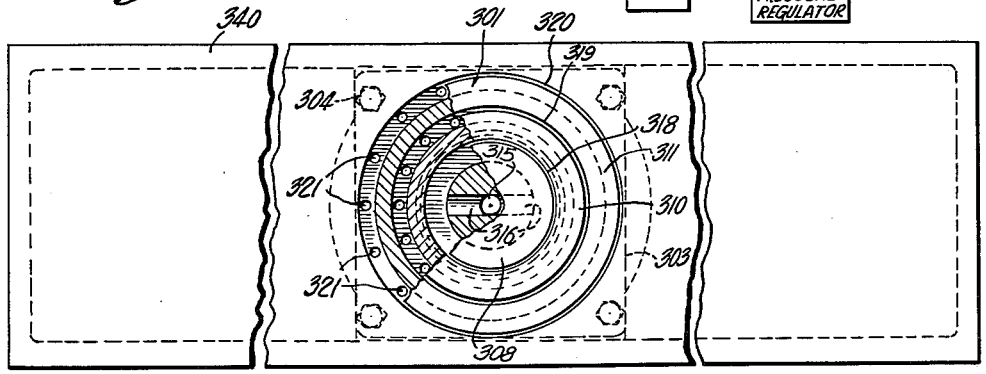
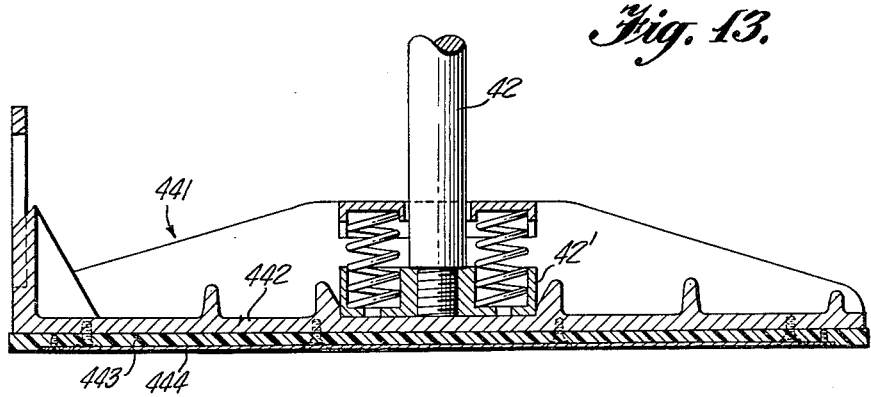

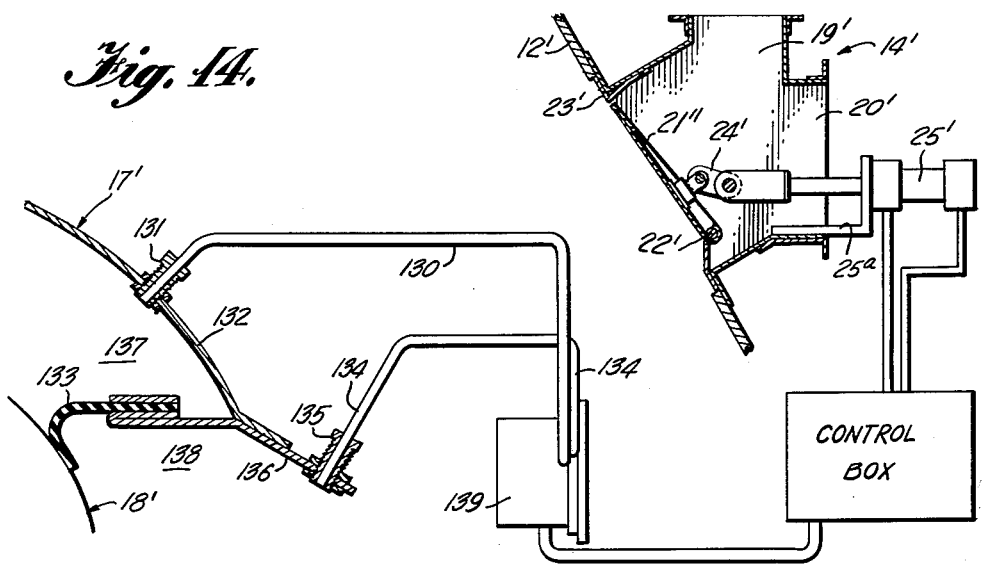
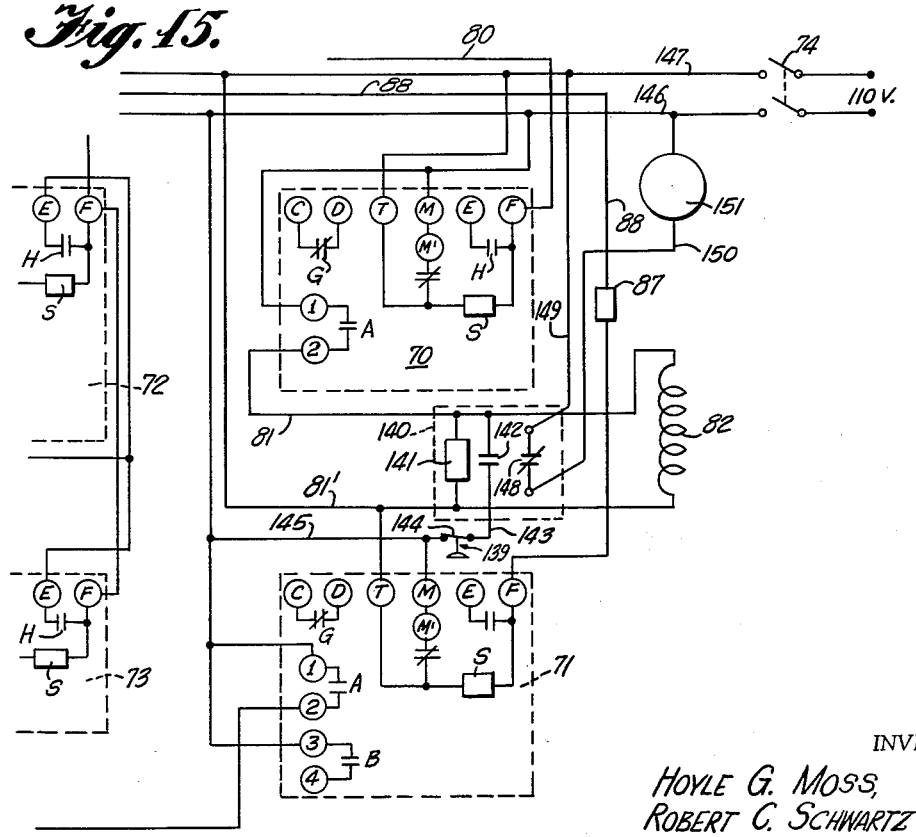

United States Patent Office 3,110,182
Patented Nov. 12, 1963

3,110,182
COTTON SAMPLING APPARATUS
Hoyle G. Moss, Robert C. Schwartz, and Thomas Richard Allen, Lubbock, Tex., assignors, by mesne assignments, to Botany Industries, Inc., New York, N.Y., a corporation of New Jersey
Filed Dec. 23, 1959, Ser. No. 861,719
18 Claims. (Cl. 73—421)

The present invention relates in general to cotton sampling apparatus, and more particularly to apparatus for obtaining good, representative samples of cotton bales during the ginning or other processing of lint cotton.

This application is a continuation-in-part of our earlier application Serial No. 772,460, filed November 7, 1958, now abandoned.

Studies made of cotton marketing practices reveal that there is a definite need for a reliable method of obtaining good, representative samples of cotton bales for classification and grading purposes, which truly represent the quality of the cotton throughout the bale. Heretofore, the customary method of providing samples of cotton bales for grading purposes has been to cut samples from the sides of the bale as it passes through marketing channels. This practice does not provide the owner of the cotton with a sample that is representative of the entire contents of the bale, as it discloses only the grade of the small volume of cotton at the side of the bale from which the sample is withdrawn. Also, this practice mutilates the bale covering, and consequently increases the hazards of lint soiling, weather and fire damage, and waste of cotton.

A truly representative cotton bale sample should be composed of portions of the lint taken consecutively throughout the bale at various stages during the pressing of the bale. This procedure, of course, can be best accomplished while the bale is being formed during the ginning process. The essential features of a good bale sample would be that it is representative of the cotton throughout the bale, it is composed of segments which represent a true cross-section of the layers of the bale, it has relatively uniform size, weight and appearance favorable to accurate classification, it is identifiable accurately with the bale from which it is drawn, and it is packaged to prevent replacement of the sample in its original form after removal of the package wrapper. The sample should duplicate the best characteristics usually looked for in hand cut bale samples since it will be handled by people trained and experienced in the classification of the hand cut type of sample.

It is, of course, desirable that such a sample be taken automatically during formation of the bale with which it is identified by means synchronizing the production of the sample with the formation of the bale. Extreme care must be taken, however, to insure that the bale sample contains lint drawn only from the batch forming the associated bale so that there will be no commingling of lint left over from prior baling operations.

An object of the present invention, therefore, is the provision of automatic cotton sampling apparatus for producing a cotton sample representative of the lint forming the associated bale, wherein the sample is produced during the ginning of the associated bale.

Another object of the present invention is the provision of novel cotton sampling apparatus which will produce a sample truly representing a cross-section of the contents of a cotton bale while the bale is being ginned.

Another object of the present invention is the provision of automatic cotton sampling apparatus which will automatically produce a sample of the contents of a cotton bale while the bale is being ginned in a manner conforming to the above enumerated desirable requirements.

Another object of the present invention is the provision of novel cotton sampling apparatus wherein the lint is withdrawn from the battery condenser housing during ginning of a cotton bale in a manner minimizing the possibility of intermingling lint allocable to a prior bale with the sample.

Another object of the present invention is the provision of a novel cotton sampling apparatus for producing a cotton sample during the ginning of a bale of cotton representative of the lint forming the associated bale, wherein lint is withdrawn from a ginning system to a sampler batt forming instrumentality at selected intervals during the ginning of a bale, the period of withdrawal of lint being regulated to produce uniform bat thickness at the instrumentality regardless of the speed of cotton ginning.

Another object of the present invention is the provision of novel cotton sampling apparatus wherein lint is withdrawn through a cotton valve from the ginning system to sampler batt forming means at selected intervals during ginning of a bale, and means are provided for closing the cotton valve when a selected bat thickness on said bat forming means is reached regardless of the speed of cotton ginning.

In recent years, the cotton industry has progressed toward the practice of making various instrument determinations of certain indices of cotton quality. For example, the practice of indicating fiber fineness by air flow resistance readings, popularly known as "micronaire values," is becoming increasingly common in the cotton trade. Such readings involve a laboratory type measurement procedure with special testing instruments wherein the resistance to air flow of a plug of cotton of known weight occupying a known space is measured to provide an indication of fiber fineness. Measurement of other cotton quality indices such as percentage moisture content, by special instruments, is becoming a more widespread practice as an aid to more precise determination of cotton quality.

Another object of the present invention is the provision of novel automatic cotton sampling apparatus wherein means are provided for yielding automatically an indication of selected properties of the lint cotton, such as fiber fineness, moisture content, and the like, during the formation of a bale and an associated sample.

Another object of the present invention is the provision of novel cotton sampling apparatus having means incorporated therein for automatically providing an indication of fiber fineness by micronaire value gauging during the formation of the sample.

Other objects, advantages and capabilities of the present invention will become apparent from the following detailed description taken in conjunction with the accompanying drawings illustrating several exemplary embodiments of the invention.

In the drawings:
FIGURE 1 is a side elevation of cotton sampling apparatus embodying the present invention with parts of the packaging unit for forming the bale sample illustrated in vertical section and portions of the cotton ginning system with which the sampler is connected being shown;

FIGURE 2 is an end elevation of the cotton sampler apparatus, with the sample packaging unit shown in vertical section;

FIGURE 3 is an enlarged, exploded perspective view of the lint cotton valve assembly;

FIGURE 4 is an enlarged fragmentary section view through a portion of the packaging unit illustrating one form of construction of a tramper lock for securing the tramper against displacement during ejection of a sample;

FIGURES 5 and 6 are fragmentary section views of a modified form of tramper lock, illustrated in locking and unlocking positions;

FIGURE 7 is a perspective view of the bag clamp for retaining tubular wrapper sleeves in position to receive the sample;

FIGURE 8 is a schematic wiring diagram of an electric system for automatically controlling the cotton sampling apparatus;

FIGURE 9 is a schematic wiring diagram of another electric system for controlling the sampler;

FIGURE 10 is a vertical section view of a modified form of cotton sampling apparatus;

FIGURE 11 is a fragmentary vertical section view of a modified form of press box construction incorporating means in the platen to facilitate automatic measurement of the bulk air flow fineness reading during sampling of the cotton, the associated components of the measuring system being indicated schematically;

FIGURE 12 is a plan view of the platen;

FIGURE 13 is a vertical section view of a modified form of tamper construction incorporating means for measuring the percentage moisture content of the cotton;

Figure 1:
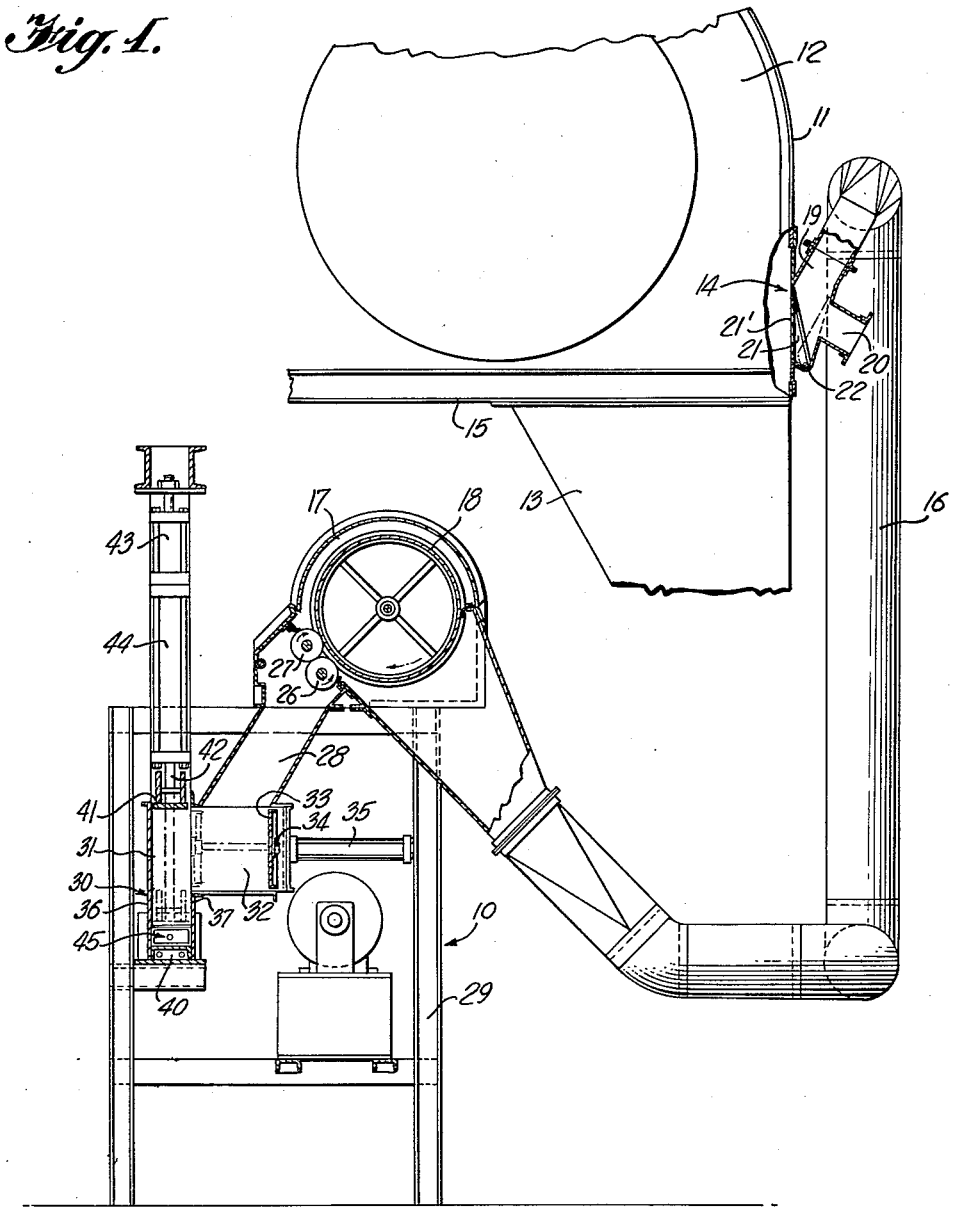

FIGURE 14 is a diagrammatic view of a modified cotton valve construction and a pressure sensitive switch unit sensing the pressure differential at the high and low pressure sides of the air seal in the sampler condenser under control of the closing of the valve member in response to accumulation of a cotton bat of selected thickness on the sampler condenser drum; and FIGURE 15 is a fragmentary schematic diagram of the modification required in the electrical circuit of FIGURE 8 to incorporate the bat control feature provided by the means of FIGURE 14, only a portion of FIGURE 8 being here repeated.

The cotton sampling apparatus of the present invention operates, in general, to produce a sample of the lint cotton being baled by taking several ounces of lint cotton periodically from a suitable location in the ginning system, such as the battery condenser housing, the common lint flue, a battery lint cleaner, or the like, during the processing of cotton by means of a specially designed valve. These portions of the lint cotton are then conveyed through duct work to a small cotton condenser, where they are formed into cotton bats and delivered in sequence into a charging box and thence into a main press box of the packaging unit. Here the bats are pressed into a composite sample, approximating gin-bale density, and discharged into a paper container which bears identification of the bale from which the sample was taken.

Referring to the drawings, wherein like reference characters designate corresponding parts throughout the several figures, and particularly to FIGURES 1–5, illustrating one exemplary structural form the invention may take, the cotton sampler apparatus indicated generally by the reference character 10 is adapted to be located in the gin house and arranged in communication with a wall 11 of the battery condenser housing 12 at a point adjacent the inlet of the lint flue 13 to the battery condenser housing. In the particular form herein illustrated, a cotton valve assembly 14 is disposed in the vertical side wall 11 of the battery condenser housing 12 just above the bottom wall 15 and adjacent the point where the lint flue 13 communicates with the wall 15. The function of the valve assembly 14 is to periodically withdraw lint cotton from this region of the battery condenser housing 12 upon opening of the valve and deliver the lint through the valve to the duct work 16 and thence to the sampler condenser 17 having a rotatable foraminous drum 18 and suitable suction means communicating with the interior of the drum 18 or with the region of the drum diametrically opposite the inlet of duct 16.

As previously stated, the valve assembly 14 may alternatively be placed in a side of the common lint flue at some location between the battery condenser and the gins, or at a battery lint cleaner interposed in the system, or at any suitable location in a cotton processing system as would be apparent to persons skilled in the art. The valve assembly 14, as is more clearly illustrated in FIGURE 3, comprises a main take-off passage 19 communicating the condenser with the duct work 16 and a venting branch 20 opening to ambient air, together with a valve member or vane 21 pivoted on the shaft 22 located at its lower end. Thus the valve member 21 may swing from a normally closed position illustrated in solid lines in FIGURE 1 wherein the wall 21' of the valve member 21 lies in the plane of the condenser housing wall 11 with the upper or free edge of the valve member located immediately adjacent the cooperating stationary valve portion 23 to close the entrance to the passage 19, to the open position illustrated in dotted lines in FIGURE 1 (solid lines in FIGURE 3) wherein the valve member opens inwardly of the passage 19 away from the condenser housing 12 and the venting branch 20 is closed. The valve member 21 is pivoted on the shaft 22 by means of a conventional linkage 24 connecting the shaft 22 with the piston rod of a hydraulic cylinder 25, located at any suitable point in the valve assembly but shown here as mounted on the side of the valve assembly housing. Upon opening of the valve 21 by activation of the cylinder 25, lint cotton is withdrawn from the region of the battery condenser housing 12 adjacent to the valve 21 through take-off passage 19 into the duct work 16 by the suction on the sampler condenser drum 18. At the discharge end of the duct work 16, the lint cotton is drawn on to the foraminous surface of the sample condenser drum 18, where it is separated from its vehicle air and formed into a cotton bat which is then presented to the doffer rolls 26, 27, which doff the cotton bat and discharge it into the inclined lint slide 28.

By virtue of the construction and arrangement of the valve assembly 14 as described above, venturi action takes place in the region of the free edge of the valve member 21 and the cooperating portion 23 as the valve member 21 approaches closed position to produce air flow along the free edge and inwardly of the duct 16 which cleans the valve member 21 and cooperating portion 23 of any cotton tags which may otherwise adhere to this edge of the valve members. In this manner, the collection of cotton or foreign matter on the valve which might be released during sampling of cotton while a later bale was being formed and give a false representation of the quality of a later bale is avoided. While some flexibility is possible in regard to the location of the cotton valve when applied to a battery condenser, the location of the valve 14 in the inlet zone of the battery condenser, as illustrated above where the lint cotton is still under effective control of its vehicle air is particularly advantageous as it minimizes the possibility of foreign matter accumulation in dead air spaces adversely affecting the sampling operation.

As will be evident from FIGURES 1 and 2 of the drawings, the small sampling condenser 17 as well as the major components of the sampling apparatus 10, are supported on a suitable framework 29. Disposed within the framework 29 is the packaging unit, generally indicated by the reference 30, which includes a generally vertically arranged main press box 31 and a charging box 32. The charging box 32 is located below and in communication with the discharge end of the lint slide 28 to receive the cotton bat which is gravity discharged down the lint slide 28 from the doffer rolls 26 and 27. The charging box forms an upwardly opening, generally rectangular chamber which may be about 12 inches wide by 27 inches long by 12 inches deep, having a pusher plate 33 conforming substantially to the cross-section of the charging box 32 normally disposed at the end thereof remote from the main press box 31. The charging box 32 is in open communication at its other end with the main press box 31. The pusher plate 33 is connected to a piston 34 driven by a hydraulic cylinder unit 35 of conventional construction whereby the pusher plate 33 is projected through a stroke corresponding substantially to the width of the charging box from the solid line position of FIGURE 1 to the dotted line position to compress the cotton bat somewhat laterally and deliver it to the main press box 31.

The main press box 31 is a chamber having a rectangular horizontal cross-section with its longest dimension extending transversely of the apparatus, and includes vertical parallel front and back walls 36 and 37 and parallel vertical side walls 38 and 39 defining a rectangular chamber which may be approximately 5 inches wide and 27 inches long extending from the level of the top of the charging box 32 to a level spaced a selected distance, for example, about 5 inches, below the bottom of the charging box. A heavy platen 40 forms the bottom of the main press box 31 against which the sample segments delivered to main press box 31 through the wall 37 from the charging box 32 are pressed into a fairly compact mass by a vertically reciprocating tramper plate 41. The tramper plate 41 is carried by a piston rod 42 driven by a pair of hydraulic cylinders 43 and 44, the tramper plate 41 being resiliently held against a block 42a on the piston rod 42 by springs 42b surrounding rods 41a rising from the plate 41 and flanking the piston rod 42. The hydraulic cylinder 43 is arranged to impart a 2 inch stroke to the tramper plate 41 and the cylinder 44 drives the tramper 41 through an additional stroke, for example 15 inches, to shift the tramper substantially into contact with the platen 40. The operation of the hydraulic cylinders driving the pusher plate 33 and the tramper 41 are such that upon the introduction of each sample segment into the charging box 32, the pusher plate 33 is actuated to first expel the sample segment into the main press box 31, compressing it laterally, and then the tramper 41 is driven downwardly from the solid line position of FIGURE 1 to the dotted line position to tramp the sample segment into the confined well, indicated generally at 45 at the charging box 32.

The automatic timing mechanism to be hereinafter described, is designed to cause the sampling apparatus to take numerous sample segments or charges at intervals during the ginning of a bale to give a representative cross-section of the bale. In the specific example herein described, 8 sample segments or charges are taken. The above described cycle for compressing the sample segment into the well portion 45 of the main press box 31 is thus repeated 8 times during the ginning of the bale. Following the tramping of the 8th segment, and responsive to the unlocking and initial turning of the gin bailing press on its turntable, a packaging cycle is initiated whereby the cylinder 35 is again activated to shift the working surface of the pusher plate 33 into alignment with the wall 37 of the main press box 31, the cylinders 43 and 44 are activated to project the tramper 41 downwardly to press the 8 cotton sample segments to the bottom of the press box 31, and the hydraulic pressure to the cylinder 43 is then shifted to the opposite end of the cylinder to raise the tramper 41 to 2 inches above the platen 40 forming the bottom or the press box 31. The compressed cotton sample of approximately bale density located in the confined volume of the main press box 31 between the platen 40 and the tramper 41 is then discharged laterally through the opening 46 in the side wall 39 of the press box by means of a discharge block 47 activated by a hydraulic cylinder 48 to project the discharge block 47 from the solid line position of FIGURE 2 to the dotted line position of that figure. A tubular mandril 49 is aligned with the discharge opening 46 in the end wall 39 to provide a tubular guide about which a suitable paper bag or wrapping sleeve may be fitted so that the compressed cotton sample is forced into the wrapper. The wrapper is frictionally held on the mandril by means of a clamp assembly 50 comprising a pair of pivoted jaws 51a, 51b which are resiliently biased toward the mandril 49 and are located outwardly of the mandril surfaces to clamp the end portions of the wrapper adjacent the main press box tightly against the mandril surfaces. Suitably shaped projections 52a, 52b on the jaw members 51a, 51b coact to coordinate movement of the jaws so that they move toward each other and away from each other in synchronism, and a suitable actuating bar 53 extends from one of the jaw members 51a, 51b to an accessible position to facilitate manual shifting of the upper jaw 51a in a clockwise direction as viewed in FIGURE 7 to release the wrapper from the mandril 49.

It will be obvious that when the cylinder 48 and the discharge block 47 are moved past the center of the tramper 41 toward the discharge opening 46, there is no upward force exerted on the left hand end portion of the tramper 41 while a very large upward force is exerted on the right hand end of the tramper due to the high state of compression of the cotton thereunder. This produces an unbalance of forces at the opposite ends of the tramper 41 when the discharge block 47 passes beneath the center of the tramper which tends to tilt the right hand end of the tramper upwardly. This would, of course, cause incomplete discharge of the cotton sample from the main press box 31 with the highly undesirable attending results. This is avoided by providing an automatic tramper locking mechanism, which may be an electrically operated system as shown in FIGURE 4 or a mechanically operated system of the type shown in FIGURES 5 and 6.

The electrically operated actuating mechanism for the automatic tramper locking mechanism, illustrated in FIGURE 4, comprises a tramper locking bolt 55 supported in the end wall 38 of the main press box 31 to reciprocate, rectilinearly from the retracted position, illustrated in the dotted lines, to the projected position, illustrated in solid lines. The bolt 55 is pivotally connected by pin 56 to an intermediate portion of actuating lever 57, one end of which is pivoted, as indicated at 58, to bifurcated post 59 mounted on the end wall 38. The other end of the lever 57 is pivoted at 60 to the plunger 61 of a solenoid 62. The solenoid 62 is energized in timed relation with other circuit elements of an electrical control system to be hereinafter described. An outer limit stop for the lever 75 may conveniently be incorporated by providing an extension on the post 59 which rises behind the lever 57 and supports an adjustable set screw positioned to abut the lever 57 when it has been shifted counterclockwise through a selected arc.

In the alternative mechanical operating scheme, illustrated in FIGURES 5 and 6, the tramper locking bolt 55 is similarly supported for reciprocative movement relative to the end wall 38 and is connected by a pin and slot connection 63 with a lever 64 pivotally supported on the end wall 38. The lever 64 is likewise connected by a pin and slot connection 65 with a vertically reciprocating actuating rod 66. A locking yoke 69 projects upwardly from the tramper 41 to provide a locking opening into which the bolt 55 projects to hold the adjacent end of the tramper 41 against downward displacement. The actuating rod 66 is supported for axial movement on the side wall 38 and has a lower end portion which projects into engagement with an angular control member 67 fixed to the discharge block 47. The control member 67 is so shaped that when the discharge block 47 occupies the retracted position illustrated in FIGURE 5, the actuating rod 66 is elevated to a position which will cause the lever 64 to retract the bolt 55. The actuating rod 66 is biased downwardly by spring 68 so that when the control member 67 is carried out from beneath the rod 66 during discharging movement of the block 47, the rod 66 shifts downwardly under the force of the spring 68, thereby rotating the lever 64 in a counter-clockwise direction to project the bolt 55 into interlocked relation with the locking yoke 69 on the tramper 41 to hold the left hand end of the tramper 41 against downward displacement.

One example of a suitable electrical control system for cycling the sampling apparatus through both the sampling phases of its cycle and the packaging of its cycle is illustrated in FIGURE 8. Referring to this figure, it will be noted that this electrical control system is built around four interval timers, designated by the reference characters 70, 71, 72 and 73. The interval timers are of conventional types available on the market for performing the timing functions desired and are well known to persons skilled in the electrical engineering and automation arts. The timers 70 to 73 in the hereinafter described example are of a well known type manufactured by General Electric Company designated by them as type TSA-18 interval timers. It will be understood, however, that timers of other makes designed to perform similar functions may be used. The control circuit of FIGURE 8 employs four timers 70-73, interval timers having terminals C, D, T, M, E, and F associated with the interval circuitry shown schematically in FIGURE 8 including a solenoid coil S between the terminals F and T, contacts G between the terminals C and D, and solenoid hold contacts H between the terminals E and F. The timers 70 and 73 are of the single-circuit type having contacts A between terminals 1 and 2, the operation of contacts A being a slave to a suitable gear train in the timer driven by motor M′, the opening and closing of contacts A being determined by pre-determined settings of an "On" control knob and an "Off" control knob associated with the terminals 1 and 2. The timers 71 and 72 are similar to the timers 70 and 73, except that they are of the two-circuit type having additional contacts B between terminals 3 and 4, and additional "On" and "Off" control knobs associated with these terminals.

When the main power switch 74 in the 110-volt line is closed and the "Hold" switch 75 is closed, the circuit to the motors in the timers 70-73 are energized and the system is in an operative condition.

When the starting switch for the control system indicated at 76, which is located on and actuated by the cotton gin plant bale press, is closed and held closed in the locked position of the bale press, the circuit through lead 77, terminals C, D, and contacts G of timer 72, lead 78, limit switch 79 and lead 80 is completed to terminal F of timer 70. This energizes the holding solenoid S of the timer 70 and puts the gear train in mesh. This will close and open the circuit through terminals 1-2 and contacts A of timer 70 on a pre-determined setting of the "On" and "Off" control knobs after the terminal F has been energized. The terminal 2 of the timer 70 is connected through lead 81 to the solenoid 82 of a single solenoid hydraulic valve which controls the hydraulic pressure to the cylinder 25 controlling the valve member 21. This energization of the solenoid 82 shifts the hydraulic pressure to the cylinder 25 to open the cotton valve member 21 to permit flow of cotton to the sampler condenser. The setting between the "On" "Off" knobs of timer 70 is the time the cotton valve 21 remains open. When the contacts A of timer 70 open and de-energize the circuit 1 and 2 of timer 70, the spring return in the hydraulic valve assembly of solenoid 82 shifts pressure back to the other end of the cylinder 25 and closes the cotton valve member 21 stopping the flow of cotton to the sampler.

The timer 70 is reset by the "Tramper Position" limit switch 79 being opened as the cotton is packed by the tramper 41 to the bottom of the press box 31. After the timer 70 resets, it goes through another cycle and continues to sample until the ginning bale press is turned or until enough cotton is in the press box 31 to keep the tramper 41 from going down far enough to actuate the limit switch 79. The setting of the "On" knob of timer 70 controls the time between the taking of samples during the ginning of a bale of cotton. The frequency of sampling is the time set on the "Off" knob of timer 70 plus the time set on the "Off" knobs of timer 71.

The "Hold" switch 75 which can be located at the press or seed scales or any other convenient location in the grinning system is a manually operated switch which is in the normally closed circuit through leads 83 and 84, starting switch 76 and lead 85 to the terminal F of timer 70 when the starting switch is as shown. The "Hold" switch 75 may be opened so that the sampler will not take a sample and will not package when it is so desired to control the sample. A manual start switch 86 may be provided in the main control box to energize the terminal F of timer 70 for trouble shooting and checking purposes only, although this switch may readily be omitted.

When the cotton valve member 21 is open, it opens the "cotton valve position" limit switch 87 which opens the circuit through lead 88 to the terminal F of timer 71. This de-energizes the holding solenoid S of timer 71 and causes the timer 71 to reset. When the cotton valve member 21 closes, the limit switch 87 closes again completing the circuit to terminal F of timer 71 and energizing its holding solenoid S to start a tramping cycle. Both of the "On" knobs of the timer 71 associated with the circuits A and B thereof are set on 5 seconds to allow cotton to get out of the sampler condenser and into the charging box 32. Then, both the circuits A and B of the timer 71 are energized. First, the circuit connected to terminal 2 of timer 71 through lead 89 to the solenoid 90 of a single solenoid hydraulic valve controlling the cylinder 35 is completed, shifting the hydraulic pressure to the opposite end of cylinder 35 and forcing the pusher plate 33 to the left as viewed in FIGURE 1 to expel cotton into the press box 31. When the pusher plate 33 reaches a position of approximate parallelism with the adjacent wall of the press box, it closes the "charging position" limit switch 91, which in turn completes the circuits to solenoids 92 and 93 of single solenoid hydraulic valves which shift hydraulic pressure to opposite ends of cylinders 43 and 44. This causes the tramper 41 to force the charge of cotton admitted from the charging box 32 to the bottom of the press box 31. Then, at the time set on the "Off" knob of timer 71, the circuits through solenoids 92, 93 and 90 are de-energized and their associated spring returns shift the hydraulic pressure to the cylinders 44, 43 and 35 to return the tramper 41 and the pusher plate 33 to their initial positions. This cycle of operation is repeated each time the cotton valve member 21 closes.

After the bale of cotton has been ginned and the gin baling press is unlocked and starts turning, the starting switch 76 is opened de-energizing "F" of timer, causing this timer to reset, ready to begin a new bale. A set of normally open contacts in the starting switch close, energizing "F" of timers 72 and 73 through leads 72′ and 73′. This energizes holding solenoid S and meshes the gear train in timers 72 and 73 and starts their timing cycle. Contacts A and B of timer 72 are closed energizing the circuits through "E" on timers 72 and 73 keeping their holding solenoids energized after the baling press is turned to locked position, opening the normally open contacts of the switch 76. When the holding solenoid of timers 72 is energized, contacts C—D of timer 72 are opened in the circuit to "F" of timer 70. This keeps the sampler from taking cotton until the cotton sample has been packaged or when timer 72 has reset closing contacts C—D of timer 72. When circuit 3—4 of timer 72 is energized and the solenoid 90 is energized, hydraulic pressure is shifted in cylinder 35 so that cotton is pushed into the press box and limit switch 91 is closed, energizing solenoids 92 and 93 and causing tramper 41 to press cotton to bottom of box 31. At the time of "Off" setting of the knob for circuit A of timer 72, contacts A open letting the spring return of solenoid 92 shift pressure to opposite end of cylinder 43 and raising tramper 41 to 2″ above bottom of press box 31. This closes "press position" limit switch 94 so that the circuit to solenoid 95 may be energized. Also when circuit B of timer 72 is energized, "E" of timer 73 is energized meshing gear train of timer 73. The "On" knob of circuit A of timer 73 is set at a time in seconds to allow circuits of timer 72 to operate and the cylinder 43 to return to its upper position. At this time with the "press position" limit switch 94 closed and circuit A of timer 73 completed through lead 96 to solenoid 95 the hydraulic pressure is shifted to the other end of hydraulic cylinder 48 moving pusher block 47 to the right which pushes the compressed cotton sample out of the press box 31 and into a paper sleeve. With the "Off" knob of circuit A of timer 73 set to open circuit A at this time, then the spring return of solenoid 95 shifts the hydraulic pressure in cylinder 48 returning block 47 to the left. While block 47 is moving from the left, limit switch 97 is opened to solenoid 92 so that cylinder 43 cannot move down while pusher block 47 is out in the box 31. The "Off" knob of circuit B of timer 72 is also set at the off time of circuit A on timer 73 as the packaging cycle is complete and the circuit B of timer 72 is opened to solenoids 90 and 93 so that the spring returns shift the hydraulic pressure in cylinders 44 and 43 returning tramper 41 to the top and pusher 33 to the right. This also opens the circuit of "E" to timers 72 and 73, de-energizing the holding coils of these timers and allowing them to reset and contacts C—D of timer 72 to close the circuit to "F" of timer 70 so that a new sampling cycle may begin. The "manual package switch" 98 located at the sampler control box is used to manually operate the packaging unit, when needed. It will be noted from the circuit of FIGURE 8 that the tramper locking solenoid 62 of the electrically operated tramper lock shown in FIGURE 4 is energized simultaneously with energizing of solenoid 95.

Another form of control circuit for the sampler is illustrated in FIGURE 9, wherein five timers 101, 102, 103, 104 and 105 and a time delay relay 106 are employed. When the main power switch 107 is closed and Hold switches 108 are closed, the timers 101—105 are energized and the system is in an operative condition. The start switch for the control system is indicated by reference character 109 and is located on and actuated by the cotton gin bale press. It is closed and held closed in the locked position of the bale press. The circuit connected with terminal F of the timer 101 is energized through the lead 110, which energizes the hold solenoid S of the timer 101 and puts the gear train of the timer in mesh. This will close and open the normally open contacts A associated with the terminals 1, 2 of the timer 101 depending upon the "On" and "Off" settings of the control knobs. These control knobs associated with the timer 101 control the total time the sampler will sample cotton or the time required to gin a bale of cotton. Since the circuit associated with the terminals 1, 2 of the timer 101 controls the length of time sampling is to be done, the "Off" setting should be set to reset the timer 101 and open the contacts A just before the completion of ginning a bale. When the terminal F of the timer 101 is energized, the contacts G associated with the terminals C, D will be opened and remain opened until the terminal F is de-energized and the timer 101 reset.

The Hold switches 108 include a first section which may be located at the bale press or seed scales, and is a manually operated switch which is in the supply circuit through the switch 109 to the terminal F of timer 101. It is designed to de-energize the terminal F of timer 101 upon opening of switch 108 to prevent taking of a sample which is not desired. The Hold switches 108 also include a second section in the supply circuit to the terminal M of the timer 101 to de-energize the motor M′ and stop the gear train so that the sampling operation can be interrupted and then continued as desired without resetting resetting the timer 101 or causing the sampler to package.

A manual start switch 111 which may be located in the control box is available to energize the terminal F for trouble shooting and checking purposes.

It will be noted that when the circuit through terminals 1, 2 of timer 101 is energized by closing of contacts A, the contacts G associated with terminals C, D of timer 104 are in closed condition, the contacts 106a in the time delay relay 106 are closed and a circuit is established therethrough to the terminal C on timer 102. When the timer 102 has been reset, the contacts G connected to terminals C, D are closed so that the terminal F of the timer 102 is thereupon energized putting the gear train of that timer in mesh and starting a timing cycle. With the "On" knob associated with terminals 3 and 4 of timer 102 set at "0" and the "Off" knob set at the length of time in minutes desired between taking of samples while ginning a bale of cotton (the interval between sample segments) the terminal F of timer 102 is energized through terminals 3, 4 thereof after the contacts G open. When contacts B associated with terminals 3, 4 of timer 102 open after the preset time period, the associated terminal F is de-energized and the timer resets completing the cycle and closing the contacts G associated with terminals C, D which in turn initiates another cycle. This repetition of cycles of the timer 102 continues as long as the circuit to terminal C of timer 102 is energized. During each cycle of timer 102, the contacts A associated with terminals 1, 2 of timer 102 are closed energizing these terminals at a preset time of the "On" knob associated therewith after the associated terminal F is energized and remain closed for a period determined by the setting of the "Off" knob associated with said terminals 1, 2. The solenoid 112 controlling the valve of the hydraulic cylinder 25 controlling the cotton valve 21 is the slave of the contacts A of timer 102, so that upon closing of the contacts A, hydraulic pressure is shifted to the opposite end of the cylinder 25 to open the valve 21 and permit flow of lint cotton to the condenser 17. The setting between the "On" and "Off" knobs associated with the terminals 1, 2 of timer 102 determine the time the cotton valve remains open. When the circuit through terminals 1, 2 of the timer 102 is de-energized a spring return in the solenoid 112 shifts pressure back to the other end of the hydraulic cylinder 25 and closes the cotton valve 21. The solenoid 112 is preferably a signal solenoid hydraulic valve.

When the cotton valve 21 is opened, it opens a normally closed limit switch 113 which de-energizes the circuit to the terminal F of the timer 103 which causes timer 103 to reset. When the cotton valve 21 closes, the limit switch 113 returns to closed condition energizing the terminal F of timer 103 to start a tramping cycle. The "On" knobs associated with both the terminals 1, 2 and 3, 4 of the timer 103 are set on 5 seconds to allow cotton to get out of the sampler condenser 17 and into the charging box 32. Then the circuit through the terminals 1, 2 of the timer 103 is energized by closing of the associated contacts A to energize the solenoid 114 of a single solenoid hydraulic valve which shifts hydraulic pressure to the opposite end of the cylinder 35 to force the pusher plate 33 toward the main press box 31. When the pusher plate 33 reaches the wall of the main press box 31, it closes the limit switch 115, which then energizes the circuits through the solenoids 116, 117 of single solenoid hydraulic valves which actuate hydraulic cylinders 43 and 44 successively to cause the tramper 41 to push the cotton all the way to the bottom of the main press box 31. Then, at the time established by the "Off" knobs on timer 103, these circuits are de-energized and the spring returns in the solenoid hydraulic valves actuate the cylinders 35, 43 and 44 to return to their normal positions. This cycle is completed every time the cotton valve closes.

The above description covers the sampling phase of the operating cycle. After the bale of cotton has been ginned and the gin baling press is unlocked and starts turning, the switch 109 is opened, de-energizing the terminal F of the timer 101 which causes this timer to reset. When the timer 101 resets, contacts G associated with the terminals C, D of timer 101 close, energizing the terminal F on timer 104. This initiates the time cycle of timer 104, closing the contacts A and B of timer 104 and energizing the circuit through lead 113 to the terminal E of timer 104, which in turn keeps the associated hold solenoid S energized after the baling press is turned to locked position closing the switch 109 by the closed contacts H. When the hold solenoid S of timer 104 is energized, contacts G associated with terminals C, D therefore are opened which de-energize the circuit to terminal C of timer 101 and keeps the sampler from taking cotton until the cotton sample has been packaged or until the timer 104 is reset. When the contacts B of timer 104 are closed, the solenoid 114 is energized to actuate the cylinder 35 and force any cotton remaining in the charging box 32 into the main press box 31, whereupon limit switch 115 is closed. This energizes the solenoids 116 and 117 to actuate the cylinders 43 and 44 and forces the tramper 41 to the bottom of the press box 31. At the time of the "Off" setting of the knob associated with terminals 1, 2 of the timer 104, the contacts A open letting the spring return of the solenoid valve 116 actuate the cylinder 43 to raise the tramper 2 inches from the bottom of the press box 31. This closes the limit switch 119 so that the circuit through the hydraulic valve solenoid 120 may be energized. Also, when the contacts B of the timer 104 are closed, the terminal F of the timer 105 is energized initiating the timing cycle of this timer. The "On" knob associated with the terminals 1, 2 of the timer 105 is set at a time in seconds to allow the contact A of the timer 104 to operate and the cylinder 43 to return to top position, whereupon the limit switch 119 is closed and the contacts A of timer 105 are closed to energize the solenoid 120 and actuate the cylinder 48 to move the discharge block 47 toward the discharge opening 46 and push the compressed cotton sample into the paper wrapper sleeve. The "Off" knob associated with terminals 1, 2 of the timer 105 is set to open the associated contacts A at this time so that the spring return of the solenoid 120 may actuate the cylinder 48 to return to normal position. While the discharge block 47 is displaced from its left hand limit position, as viewed in FIGURE 2, the normally closed limit switch 121, is opened to prevent energization of the solenoid 116 in a manner to force the cylinder 43 down so as to prevent downward forcing of the tramper 41 while the discharge block 47 is out of the press box. The "Off" knob associated with the terminals 3, 4 of the timer 104 is set at the same "Off" time of the terminals 1, 2 of timer 105 to open the circuit to the solenoids 114 and 117 so that the cylinders 44 and 35 are actuated to return the tramper 41 and pusher plate 33 to their normal position. This also opens the circuit to terminal E of timer 104 to de-energize the holding coils of timers 104 and 105 and allow them to reset. The closing of the contacts G associated with terminals C, D of timer 104 then, of course, closes the circuit to terminal C of timer 102 to condition the unit to commence a new sampling cycle. A manual packaging switch 122 may be provided to effect manual operation of the packaging unit when needed.

Circuit means are associated with the time delay relay 106 to protect the system in the event too much cotton is put into the main press box 31. This includes a normally open limit switch 123 disposed at a position in the press box 31 to be closed by the tramper 41 when the tramper is held off the bottom of the press box by putting too much cotton in the box. If the tramper 41 remains at this position where it closes the limit switch 123 for a period of 2 seconds, the time delay relay 106 is energized to open the normally closed contacts 106a thereby breaking the circuit to the terminal C of timer 102 and the normally open contacts are closed to hold the relay in energized condition. The de-energizing of the terminal C of timer 102 stops the further taking of samples until the bale press is turned or until the contacts A of the timer 101 open.

When the opening and closing of the cotton valve through which the lint is withdrawn from the ginning system is regulated solely by the time settings of the "On" and "Off" knobs of timer 70, it has been found that considerable variation may occur in the thickness of the bats formed on the sampler condenser drum 18 for the charges of lint as the speed of ginning varies. This occurs because the cycling of the cotton valve is controlled solely as a function of time rather than quantity of cotton withdrawn. FIGURES 14 and 15 illustrate a modification which insures the production of uniform charges for each sample charge regardless of ginning speed, the circuit of FIGURE 15 being only a slight modification of the circuit of FIGURE 8.

Referring to FIGURE 14, wherein a slight modified cotton valve structure is shown, the cotton valve 14' is in this case mounted on the wrapper sheet of the battery condenser, indicated at 12', and comprises a main take off passage 19', a venting branch 20', a valve member or vane 21" pivoted on the sheet 22' at its lower end, a cooperating stationary valve portion 23' and a hydraulic cylinder 25' having a piston rod coupled to the valve member 21' by linkage 24', all generally similar to the valve member 14 shown in FIGURES 1 and 3 but modified slightly in shape and arrangement. The hydraulic cylinder 25' is disposed within the venting branch 20' by mounting it on a bracket 25a, the shaft 22' is withdrawn slightly outwardly from the plane of the valve opening at the wrapper sheet 12', and the stationary valve portion 23' is in the form of a wedge-shaped sheet across the upper edge of the valve opening to minimize the collection of cotton tags in this region.

The sampler condenser here designated as 17', is identical to the condenser 17 except that a tube 130 is supported at one end by fitting 131 in the top wrapper sheet 132 of the sampler condenser 17' above the air seal 133 engaging the condenser screen drum 18' and a tube 134 is supported at one end of fitting 135 in wall portion 136 below the air seal 133. These ends of the tubes 130 and 134 communicate respectively with low pressure area 137 and high pressure area 138 of the condenser and communicate these pressures to the low and high pressure sides of a diaphragm actuated differential pressure switch 139. The pressure switch 139 is adjusted to effect closing of the cotton valve 14' when the cotton bat on the sampler condenser drum 18' has reached a selected thickness producing a related pressure difference between the areas 137 and 138.

Reference is now had to FIGURE 15 of the drawings illustrating the modifications required in the control circuit of FIGURE 8 to permit the pressure switch 139 to control the termination of the open phase of the cotton valve 14'. Since the incorporation of this pressure switch control feature involves only additions to the circuit of FIGURE 8, only the adjacent parts of the FIGURE 8 circuit is reproduced in FIGURE 15. This modification of the FIGURE 8 control circuit includes the provision of a relay 140 having a coil 141 coupled between the leads 81 and 81' forming the supply and return leads for the solenoid 82 of the single solenoid hydraulic valve controlling the hydraulic pressure to the cotton valve cylinder 25'. Normally open hold contacts 142 which are closed by energization of the coil 141 are coupled to the lead 81 and through a lead 143 having the normally closed contacts 144 of pressure switch 139 therein to the lead 145 returning to line 146 of the main supply lines 146, 147.

A normally closed contact 148 is also included in the relay 140 under control of the relay coil 141 and is interposed in a circuit including a lead 149 connected to the main supply line 147 and a lead 150 extending through a gear motor 151 to the main supply line 146, the gear motor 151 being provided to drive the screen drum 18' of the sampler condenser.

The operation of this circuit will now be described, reference being had to both FIGURE 15 and FIGURE 8. When the main power switch 74 in the 110 volt supply line 146, 147 is closed, and the "Hold" switch 75 is closed, the circuit to the motors in the timers 70–73 are energized and the system is in an operative condition.

When the switch 76 which is located on and actuated by the cotton gin plant bale press is not depressed and the bale press is in the locked position, the circuit to the terminal F of the timer 70 through the terminals C, D and contacts G of timer 72, lead 78, limit switch 79, and lead 80. This energizes the holding solenoid S of the timer 70 and puts the gear train in mesh. This will close and open the circuit through terminals 1—2 and contacts A of the timer 70 on a predetermined setting of the "On" and "Off" control knobs after the terminal F has been energized. The closing of the circuit through terminals 1—2 of timer 70 energizes the solenoid 82 of the single solenoid hydraulic valve which controls the hydraulic pressure to the cylinder 25 or 25' controlling the valve member 21 or 21', to open the valve to cotton flow to sampler condenser 18'. Closing of the contact A to complete the circuit through the terminals 1 and 2 of the timer 70 and apply voltage to the lead 81 also energizes the coil 141 of relay 140, which closes the normally open contacts 142 thereof and allows current to flow through the lead 143 and pressure switch contacts 144 to lead 145 and main supply line 146 as long as the contacts 144 of screen drum differential pressure switch 139 are closed. The "Off" knob for the timer 70 is set for only a short impulse to allow the pressure switch 139 to take over control of the holding circuit for the relay 140 through lead 143 and close the valve member 21 or 21' at the proper time. The pressure switch 139 is actuated by a diaphragm moved by the change of pressure caused by cotton building up on the sampler condenser drum 18' and acting through the two pressure lines 130 and 134 communicating with the pressure zones 137 and 138 on each side of the air seal 133. As cotton builds up on the condenser screen 18' obstructing air flow through screen, the pressure decreases on the inside of the screen drum communicating with the area 137 and increases on the outside 138, so that by adjusting the spring tension on the diaphragm of the pressure switch 139, the thickness of the bat can be controlled. When the pressure differential reaches a selected value, the contacts 144 of the pressure switch 139 are opened, opening the relay hold circuit through the lead 143 and terminating current to the solenoid 82 so that the spring return of the hydraulic valve for the cotton valve cylinder 25' shifts pressure back to the other end of the cylinder to close the cotton valve 14' and stop the flow of cotton.

The set of normally closed contacts 148 of the relay 140 open when the cotton valve 14' opens, allowing the sampler condenser screen drum to start and the cotton to completely cover the screen so that an even pad is formed producing a uniform charge for the sampler. When the relay 140 is de-energized by opening of the contacts 144 of pressure switch 139, the contacts 148 close, starting the gear motor 151 to rotate the sampler condenser drum 18' and allow the cotton deposited thereon to be doffed into the charging box. The timer 70 is reset by the switch 79 and repeats cycles in the manner previously described in column 7, lines 66–73.

Reference will now be had to FIGURE 10 of the drawings illustrating a modified form of cotton sampler. In the ensuing description, parts corresponding to elements in the previously described embodiment will be designated by reference characters of the 200 series wherein the last two digits correspond to the reference characters used in the first embodiment. This modified sampler includes a condenser 217 which receives the sample segments of lint cotton entrained in vehicle air through duct work 216, the vehicle air being separated from the lint cotton by the foraminous condenser drum 218 to form a cotton bat which is doffed by the doffer rolls 226, 227 and discharged down the lint slide 228. Instead of the charging box of the first embodiment, this form comprises a charging box 201 located above and opening into a main press box 202 having tramper 241 which reciprocates on a horizontal axis instead of a vertical axis. The charging box 201 has a movable front wall 203 formed by a pivoted plate 204 having a free upper edge and being pivoted adjacent its lower edge on shaft 205 for movement through an arc indicated by the arrow 206 from a substantially vertical position clockwise to a substantially horizontal position coplanar with an upper wall 207 of the press box 202. The opposite wall of the charging box 201, indicated by the reference character 208, is an arcuate plate conforming generally and spaced closely adjacent to the cylindrical path swept by the free edge of the pivoted wall 203. The tramper 241 is connected to the piston rod 242 and driven by the hydraulic cylinders 243 and 244 arranged in series to successively drive the tramper 241 from the solid line position of FIGURE 10 through a two inch stroke under the influence of the cylinder 243 and then through a stroke under the influence of the cylinder 244 equal to the remaining distance to the platen 240 forming the end of the press box 202. After each closing of the cotton valve and a slight delay, the hydraulic cylinder 243 is actuated to force the tramper 241 in the direction of the arrow 209 and, through the linkage indicated by the reference character 210 connected to the shaft 205, swing the plate 204 downwardly into co-planar relation with the wall 207 of the press box 202. The actuation of the hydraulic cylinder 244 immediately following each actuation of the cylinder 243 then drives the tramper 241 toward the platen 240 through the remaining portion of its tramping stroke, whereupon the tramper 241 is returned to the solid line position of FIGURE 10 and cycle is repeated for each sample segment. Dogs 211 pivoted on the shaft 212 and projecting through the bottom wall 213 of the press box 202 are resiliently biased by spring 214 to the position illustrated in FIGURE 10 and are cammed out of the way by the tramper 241 each time the tramper moves to the projected or dotted line position of FIGURE 10. When the tramper returns to the right or solid line position, the dogs return to their solid line position projecting into the press box 202 to hold the cotton against the platen 240.

This operation continues until the proper amount of cotton has been compressed in the press box 202 whereupon, when the cotton bale press is turned, the hydraulic cylinders 243 and 244 are actuated to drive the tramper 241 again to the sample compressing position. Then by suitable control circuitry of the type described in connection with the first embodiment, the hydraulic pressure to the cylinder 243 is reversed to back the tramper 241 away from the platen 240 approximately 2 inches, and then the hydraulic cylinder 248 is actuated to force the discharge block 247 toward the discharge opening 246 and wrapper sleeve mandril 249 to force the compressed sample into a suitable tubular wrapper sleeve fitted on to the mandril 249.

The control system for this sample is substantially the same and incorporates substantially the same engineering principles as that described in the previous embodiments except that the hydraulic valve solenoids 114 or 90 and the limit switch 115 or 91 are omitted due to the omission of the hydraulic cylinder 35 and the pusher plate 33.

Referring now to FIGURES 11 and 12 of the drawings, there is illustrated a modified form of construction for the end or platen of the main press box so designed as to permit measurements of the air flow fineness reading of the cotton sample to be made after it has been compressed during the packaging cycle of the sampler and before discharge of the sample into the wrapper. As discussed earlier in this specification, it has become an increasingly common practice to determine the fiber fineness of cotton by the air flow method as an aid in the merchandising of bale cotton. These air flow fineness readings which have been widely termed "micronaire values" in the trade and by the U.S. Department of Agriculture have been increasingly relied upon as a tool in cotton commerce and for mill process control, for example, in control of blending of bales and in connection with drying and bleaching of cotton. These readings then provide an index of cotton fiber fineness which may be specified by mills or other buyers to designate the particular properties they desire in their cotton.

Heretofore, the air flow fineness readings have been made with precision measuring instruments, for example, of the type and by the procedure described in the article entitled "Method of Test for Fineness of Cotton Fibers by Micronaire" at page 435 of the compilation of "ASTM Standards on Textile Materials," November 1957. The testing procedure for this type of instrument involves the careful weighing of a cotton specimen to provide a test specimen of 50 grains, one grain or 3.2 grams, which must be introduced into a test chamber, subjected to pressure from a chamber closure device to confine the test specimen to a precise volume, and then subjected to carefully regulated air pressure to effect a reading from an air pressure indicating device. Such a procedure thus involves considerable handling of the cotton by human hands and interruption of the normal cotton processing channels.

In order to permit bulk air flow fineness readings to be made in conjunction with the cotton sampling operation at the gin the end wall or platen 340 of the main press box 331, which corresponds generally to the platen 40 shown in FIGURE 1, is provided with an orifice head unit 301 at the longitudinal and transverse center of the platen 340. The orifice head unit 301 must be very precisely made to provide proper air flow characteristics, and comprises a central core member 302 having a generally rectangular base portion 303 adapted to be secured peripherally by bolts 304 to an annular depending boss 305 on the upper platen wall 306 bounding a central, circular aperture 307 in the wall 306. A central post portion 308 rises from the base portion 303 and terminates at its upper end in an outwardly flaring cap 309 having a planar circular top lying in the plane of the upper surface of the platen wall 306. The post portion is surrounded by a first annular channel shaped ring 310, which in turn is surrounded by a second annular channel shaped ring 311 each being concentric with the axis of the post portion 308. The above-described components of the orifice head unit 301 coact to form three concentric annular channels 312, 313, and 314 surrounding the post 308. A vertical inlet bore 315 is adapted to be coupled to a supply of precisely controlled air pressure in a manner to be later described and communicates through radical bores 316 with the inner channel 312, which in turn communicates with the interior 317 of the press box 331 through an uninterrupted circular opening 318 between the ring 310 and the periphery of the cap 309 of post 308. The opening 318 therefore forms the entrance opening for admission of air under pressure into the press box 331. Similar concentric openings 319 and 320 of greater diameter formed between the rings 310 and 311, and between the ring 311 and the boundary wall of opening 307, respectively, form the air return openings for the unit for returning air to the chambers 313 and 314. The chambers 313 and 314 are vented to ambient air through ports 321 in the base portion 303 and registering ports in the base of flanges of rings 310 and 311 and communicates with each other through apertures 322 in the web of ring 311. An annular boss 323 at the base of post 308 assists in precisely locating the inner ring 310 relative to the post 308. Additionally, the base of the inner ring 310 is grooved to seat a sealing ring to effectively seal the chambers 313 and 314 in the air return path for the chamber 312.

The precisely controlled air pressure to be applied to the inlet bore 315 may be derived from any suitable source and flow measuring device, but as schematically shown in FIGURE 11, the compressed air source supplies air under pressure through a conventional precision air line pressure regulator 325 and a conventional air flow measuring and indicating device 326 to tube 327 coupled to the inlet bore 315, whereby changes in rate of air flow supplied to the inlet bore 315 may be measured. The indicating device 326 may, for example, be of the type disclosed in U.S. Patents Nos. 2,465,035 or 2,477,399, or that disclosed in the aforementioned ASTM article. If desired, moisture separating filter means of conventional form may be interposed in the air supply line.

The air supply system to the orifice head unit 301 will be supplied with suitable manually operated or electrically activated control means to admit air under pressure to the inlet bore 315 when the tramper 41 has descended to fully compress the cotton sample during the packaging cycle. Because the chamber defined between the platen 340 and tramper 41 and the bounding walls of the press box 331 is of known volume and compresses the sample charges to a sufficiently uniform density, the highly compressed cotton occupying this volume may serve as the test specimen for the purposes of bulk air flow fineness testing. The air under pressure introduced into the press box through the entrance opening 318 passes through the cotton sample along various paths to the return openings 319, 320 and thence discharges to ambient air. The two return or exit openings are to reduce the effects of stray exits in the chamber. By suitable calibration of the scale of the measuring and indicating device 326, the resistance of the cotton sample to air flow and thus the bulk air flow fineness reading of the cotton sample can be read and applied to the usual bale identification tag associated with the sample or printed by a suitable automatic printing device.

This arrangement, therefore, permits the bulk air flow fineness readings to be made at the gin in a very convenient manner and eliminates human handling of the test sample or weighing of the specimen such as are incident to the prior methods of making such readings.

FIGURE 13 illustrates a modified form of tramper, here designated by the reference character 441, designed to permit measurements of moisture content percentage of the cotton to be made when the tramper is down in the press box during the packaging cycle. This measurement is made by metering the electrical resistance or conductivity of the compressed sample of cotton related to moisture percentage. This may be accomplished by providing on the bottom of the tramper casting 442, or if desired on the platen 340, a phenolic insulator plate 443 which is substantially coextensive in outline to the lower surface of the tramper casting and which has a shallow, rectangular well centrally located in the lower surface of the plate 443 and spaced from the periphery of the plate 443 to space the heads of the screws from the electrode plate 444 and thereby insulate these elements from each other. The electrode plate 444 may be removably secured to the phenolic plate 443 by small screws which are shorter than the depth of the phenolic plate 443 and are countersunk into the electrode 444. The countersunk openings and the well for the electrode plate 444 are dimensional so that the elements all terminate flush with the lower surface of the electrode plate 444.

An electrical measuring bridge of a type which will be apparent to persons skilled in the art of electrical measurement is coupled with the electrode plate 444 as one electrode and the body of the sampler unit or press box as the other electrode between which electrical current is conducted through the compressed cotton in the press box. This pair of electrodes and cotton current path therebetween forms one leg of the bridge circuit, and effects an unbalance of the bridge in relation to the variations in resistance or conductivity through the cotton resulting from variations in moisture content. The extent of unbalance is detected by deflection of an ammeter disposed across the measuring bridge in usual fashion, the meter scale being calibrated directly in percentage of moisture to facilitate direct reading of the moisture content percentage.

It will be observed that the above-described arrangements for determining the bulk air flow fineness reading and moisture percentage of cotton samples during the packaging cycle greatly facilitate the gauging of these factors at the gin or during the formation of the sample in conjunction with any cotton processing system and eliminate the necessity of human handling of the cotton, the temporary withdrawal of the cotton from normal processing channels, and the careful laboratory type measuring techniques incident to the prior art methods of determining these factors.

In the preceding discussion, it was pointed out that the tramper plate 41, when it descends through the press box 31 upon delivery of each sample charge to the press box, tramps the charge to such a density that each charge in the final sample can be substantially separated from the remaining charges when the sample wrapper is broken. The density or extent of compression of the individual charges to permit such separation in the final sample is herein termed the "separable charge density."

While several specific embodiments of the invention have been particularly shown and described, it is apparent that other modifications may be made without departing from the spirit and scope of the invention, and it is desired, therefore, that only such limitations shall be placed thereon as are imposed by the prior art and are set forth in the appended claims.

What is claimed is:

1. Apparatus for sampling fibrous material during the processing of the same to provide a sample composed of a plurality of charges of the fibrous material withdrawn from the processing system at selected intervals during the processing of the fibrous material representing discreet segments of the material being processed, comprising valve means for periodically withdrawing a charge of the fibrous material from the processing system, a sampler press box having a discharge opening therein and a stationary compression surface, means for transferring the charges withdrawn by said valve to said press box, tramper means movable reciprocatively in said press box to compress each charge transferred to said press box against said compression surface, means for actuating said valve means to withdraw a selected number of charges at selected periodic intervals during the processing of the fibrous material, means for forcing said tramper means to advance toward and withdraw from said compression surface through a selected total stroke including first drive means for driving said tramper means rectilinearly reciprocatively through a first stroke segment of selected distance corresponding substantially to the height of the discharge opening and second drive means for driving said tramper means in selected relation to said first drive means through a second stroke segment forming the complement of said first stroke segment relative to said total stroke, said first and second drive means being cooperable to activate said tramper means to compress each charge withdrawn during one opening of said valve means to separable charge density and to compress the accumulated sample charges in the press box representing a selected amount of processed material into a mass of selected sample density aligned with said discharge opening and having a height substantially equal to the height of the discharge opening, means for independently activating said first drive means to withdraw said tramper means through said first stroke segment to a position substantially aligned with the top of said discharge opening, means for supporting a sample retaining wrapper externally of said press box in alignment with a selected axis of the accumulated sample charges tramped to said selected sample density, and discharge means operative in timed relation to said tramper means for forcing said accumulated sample charges through said discharge opening into said retaining wrapper.

2. Apparatus for sampling lint cotton during the ginning of the cotton to provide a sample composed of a plurality of charges of lint withdrawn from the ginning system at selected intervals during the ginning of a bale representing plural level sections of the bale contents, comprising valve means for periodically withdrawing a charge of the aggregate lint cotton output of a battery of gin stands from the cotton ginning system, a sampler press box having a discharge opening therein and a stationary compression surface, means for transferring the charges of cotton withdrawn by said valve to said press box, tramper means movable reciprocatively in said press box against said compression surface to compress each charge of lint cotton transferred to said press box, means for actuating said valve means to withdraw a selected number of charges at selected periodic intervals during the ginning of a bale, means for forcing said tramper means to advance toward and withdraw from said compression surface through a selected total stroke including first drive means for driving said tramper means rectilinearly reciprocatively through a first stroke segment of selected distance corresponding substantially to the height of the discharge opening and second drive means for driving said tramper means in selected relation to said first drive means through a second stroke segment forming the complement of said first stroke segment relative to said total stroke, said first and second drive means being cooperable to activate said tramper means to compress each charge withdrawn during one opening of said valve means to separable charge density and to compress the accumulated sample charges in the press box representing a single bale into a mass of substantially bale density aligned with said discharge opening, means for independently activating said first drive means to withdraw said tramper means through said first stroke segment to a position substantially aligned with the top of said discharge opening, means for supporting a sample retaining wrapper externally of said press box in alignment with a selected axis of the accumulated sample charges tramped to substantially bale density, and discharge means operative in timed relation to said tramper means for forcing said accumulated sample charges through said discharge opening into said retaining wrapper.

3. Apparatus for sampling lint cotton during the ginning of the cotton to provide a sample composed of a plurality of charges of lint withdrawn from the ginning system at selected intervals during the ginning of a bale representing plural level sections of the bale contents, comprising a sampler condenser for separating lint cotton from vehicle air and forming a bat of the lint cotton, valve means for periodically withdrawing a charge of the lint cotton from the ginning system and delivering the same to said sampler condenser, a sampler press box having a discharge opening therein and a stationary compression surface, means for transferring the bat formed by said sampler condenser to said press box, a tramper plate movable reciprocatively in said press box to compress each charge of lint cotton transferred to said press box against said compression surface, means for opening said valve means to withdraw a selected number of charges at selected periodic intervals during the ginning of a bale, means for forcing said tramper plate to advance toward and withdraw from said compresion surface in continuous parallelism therewith through a selected total tramping stroke including first plate driving means for moving said tramper plate rectilinearly reciprocatively through a first stroke segment of selected distance corresponding substantially to the height of said discharge opening and a second plate driving means for moving said tramper plate in series relation to said first driving means through a second stroke segment forming the complement of said first stroke segment relative to said total tramper stroke, means for activating said first and second driving means to shift said tramper plate toward said compression surface through said total stroke to compress each charge of lint cotton following each opening of said valve means and to compress the accumulated sample charges in the press box representing a single bale into a mass of substantially bale density aligned with said discharge opening, means for activating said first driving means in a reverse direction independently of the second driving means to withdraw said tramper plate through said first stroke segment to align the tramper plate substantially with the top of said discharge opening means for supporting a sample retaining wrapper externally of said press box in alignment with a selected axis of the accumulated sample charges tramped to substantially bale density, and discharge means operative in timed relation to said tramper plate for forcing said accumulated sample charges through said discharge opening into said retaining wrapper.

4. Apparatus for sampling lint cotton periodically during the ginning of a bale to produce a sample representative of the bale contents and adapted to be associated with a cotton ginning system of the type including a battery of gin stands producing a lint cotton output conveyed by vehicle air in a lint stream and a condenser surface for forming a bat of the aggregate lint cotton output of the gin stands, comprising valve means for periodically withdrawing a charge of the aggregate lint cotton output of the battery of gin stands from the lint stream anterior to the condenser surface, said valve means having a closed position lying alongside the lint stream and opening away from the lint stream, means pivotally supporting said valve means at the upstream end thereof relative to the lint stream, a sampler press box having a fixed compression surface and a discharge opening adjacent said compression surface, means for separating the charges of withdrawn lint cotton from vehicle air and transferring the lint cotton to said press box, tramper means movable reciprocatively in said press box relative to said compression surface to compress each withdrawn segment of lint cotton to separable charge density against said compression surface, means for actuating said valve to withdraw a selected number of charges of lint cotton from the lint stream during ginning of one bale, means for forcing said tramper means to advance toward and withdraw from said compression surface through a selected total stroke including first drive means for driving said tramper means rectilinearly reciprocative through a first stroke segment of selected distance corresponding substantially to the height of the discharge opening and second drive means for driving said tramper means in selected relation to said first drive means through a second stroke segment forming the complement of said first stroke segment relative to said total stroke, said first and second drive means being cooperable to activate said tramper means to compress each charge withdrawn during one opening of said valve means to separable charge density and to compress the aggregate sample charges representing one bale in the press box into an elongated mass of substantially bale density aligned longitudinally with said discharge opening and having a height equal to the height of the discharge opening, means for activating said first drive means in a reverse direction independently of the second drive means to withdraw said tramper means through said first stroke segment to align the tramper means substantially with the top of said discharge opening means for supporting a wrapper sleeve externally of said press box in alignment with a selected axis of said mass of accumulated sample charges, and discharge means operative in timed relation to said tramper means for forcing said mass of accumulated sample charges through said discharge opening and into said wrapper sleeve.

5. Apparatus for sampling lint cotton periodically during the ginning of a bale to produce a sample representative of the bale contents and adapted to be associated with a cotton ginning system of the type including a battery of gin stands producing a lint cotton output conveyed by vehicle air in a lint stream and a condenser surface for forming a bat of the aggregate lint cotton output of the gin stands, comprising valve means for periodically withdrawing a charge of the aggregate lint cotton output of the battery of gin stands from the lint stream anterior to the condenser surface, said valve means including a generally planar vane pivotally supported at the upstream end thereof relative to the lint stream having a closed position lying alongside the lint stream and opening away from the lint stream, a sampler press box having a fixed compression surface and a discharge opening adjacent said compression surface, means for separating the charges of withdrawn lint cotton from vehicle air and transferring the lint cotton to said press box, tramper means movable reciprocatively in said press box relative to said compression surface to compress each withdrawn segment of lint cotton against said compression surface, means for actuating said valve to withdraw a selected number of charges of lint cotton from the lint stream during ginning of one bale, means for forcing said tramper means to advance toward and withdraw from said compression surface in continuous parallelism therewith through a selected total tramping stroke including first driving means for moving said tramper means rectilinearly reciprocatively through a first stroke segment of selected distance corresponding substantially to the height of said discharge opening and a second driving means for moving said tramper means in series relation to said first driving means through a second stroke segment forming the complement of said first stroke segment relative to said total tramper stroke, means for activating said first and second driving means to shift said tramper means toward said compression surface through said total stroke to compress each charge of lint cotton following each opening of said valve means and to compress the aggregate sample charges representing one bale in the press box into an elongated mass of substantially bale density aligned longitudinally with said discharge opening and having a height equal to the height of the discharge opening, means for supporting a wrapper sleeve externally of said press box in alignment with the longitudinal axis of said mass of accumulated sample charges, and discharge means operative in timed relation to said tramper means for forcing said mass of accumulated sample charges longitudinally through said discharge opening and into said wrapper sleeve.

6. Apparatus for sampling lint cotton periodically during the ginning of a bale to produce a sample representative of the bale contents and adapted to be associated with a cotton ginning system of the type including a battery of gin stands producing a lint cotton output conveyed by vehicle air in a lint stream and a condenser surface for forming a bat of the aggregate lint cotton output of the gin stands, valve means for periodically withdrawing a charge of the aggregate lint cotton output of the battery of gin stands from the lint stream anterior to the condenser surface, said valve means having a closed position lying alongside the lint stream and opening away from the lint stream, a sampler press box having a stationary compression surface and a discharge opening adjacent said compression surface, a sampler condenser for separating lint cotton from vehicle air and forming a bat of the lint cotton, a charging chamber communicating said press box with said valve means for transferring the lint cotton withdrawn through said valve means to said press box, means for transferring the bat formed by said sampler condenser to said charging chamber, a member for expelling each charge of cotton delivered to said charging chamber into said press box, tramper means movable reciprocatively in said press box from a remote to a proximate position relative to said compression surface to compress each withdrawn charge of lint cotton to separable charge density against said compression surface, means for actuating said valve to withdraw a selected number of charges of lint cotton from the lint stream during ginning of one bale, means for forcing said tramper means to advance toward and withdraw from said compression surface through a selected total stroke including first drive means for driving said tramper means rectilinearly reciprocatively through a first stroke segment of selected distance corresponding substantially to the height of the discharge opening and second drive means for driving said tramper means in selected relation to said first drive means through a second stroke segment forming the complement of said first stroke segment relative to said total stroke, said first and second drive means being cooperable to activate said tramper means to compress each charge withdrawn during one opening of said valve means to separable charge density and to compress the aggregate sample charges representing one bale in the press box into an elongated mass of substantially bale density aligned longitudinally with said discharge opening, means for supporting a wrapper sleeve externally of said press box in alignment with the longitudinal axis of said mass of accumulated sample charges, and discharge means operative in timed relation to said tramper means for forcing said mass of accumulated sample charges longitudinally through said discharge opening and into said wrapper sleeve.

7. In apparatus for sampling fibrous material during the processing of the same, the combination recited in claim 1 wherein said valve means comprises a wall bounding the path of fiber flow in said processing system having a valve opening therein, a pivoted vane member extending from the pivotal axis thereof along the direction of travel of the fibrous material through the processing system and terminating in a free edge facing toward the direction of withdrawal of the fibrous material, means for pivoting said vane member through an arc extending away from the path of fiber flow in said processing system between open and closed positions relative to said valve opening, suction means for withdrawing fibrous material through said opening for delivery to said press box when said vane member is in open position and producing a venturi air flow along said free edge of said vane member as the latter approaches closed position to clean said free edge of any tags or adherent fibers.

8. In apparatus for sampling lint cotton during the ginning of a bale, the combination recited in claim 4 wherein said valve means comprises a wall bounding the path of cotton flow, said wall having a valve opening therein, a pivoted vane member extending from the pivotal axis thereof along the direction of flow in the adjacent part of the ginning system and terminating in a free edge extending toward the direction of flow of the cotton withdrawn through said valve means, means for pivoting said vane member through an arc extending away from said path of cotton flow between open and closed positions relative to said valve opening, suction means associated with said means for separating the lint cotton from vehicle air for withdrawing lint cotton through said opening for delivery to said press box when said vane member is in open position and producing a venturi air flow along said free edge of said vane member as the latter approaches closed position to clean said free edge of any tags or adherent cotton.

9. Apparatus for sampling fibrous material during the processing of same to provide a sample composed of a plurality of charges of the fibrous material withdrawn from the processing system at selected intervals during the processing of the fibrous material representing discrete segments of the material being processed, comprising valve means for periodically withdrawing a charge of the fibrous material from the processing system, a sampler press box having a discharge opening therein and a stationary compression surface, means for transferring the charges withdrawn by said valve to said press box, tramper means movable reciprocatively in said press box to compress each charge transferred to said press box, means for actuating said valve to withdraw a selected number of charges at selected periodic intervals during the processing of the fibrous material, said tramper means being adapted to compress each charge withdrawn during one opening of said valve means to separable charge density and to compress the accumulated sample charges in the press box representing a selected amount of processed material into a mass of selected sample density aligned with said discharge opening and having a height substantially equal to the height of the discharge opening, means for supporting a sample retaining wrapper externally of said press box in alignment with a selected axis of the accumulated sample charges tramped to said selected sample density, discharge means operative in timed relation to said tramper means for forcing said accumulated sample charges through said discharge opening into said retaining wrapper, said tramper means including a rectangular tramper plate movable within said press box in parallelism with said compression surface, hydraulic cylinder means for forcing said tramper plate through a total stroke moving the tramper plate through said press box including a first hydraulic cylinder for driving said tramper plate through a first stroke segment of selected distance corresponding to the height of the discharge opening and a second cylinder arranged in series relation to said first cylinder for driving said tramper plate through a second stroke segment forming the complement of said first stroke segment relative to said total stroke following actuation of said first cylinder, and means for reversely actuating said first cylinder independently of said second cylinder to withdraw said tramper plate through said first stroke segment to the level of the top of the discharge opening.

10. Apparatus for sampling lint cotton periodically during the ginning of a bale to produce a sample representative of the bale contents and adapted to be associated with a cotton ginning system of the type including a battery of gin stands producing a lint cotton output conveyed by vehicle air in a lint stream and a condenser surface for forming a bat of the aggregate lint cotton output of the gin stands, comprising valve means for periodically withdrawing a charge of the aggregate lint cotton output of the battery of gin stands from the lint stream anterior to the condenser surface, said valve means having a closed position lying alongside the lint stream and opening away from the lint stream, means pivotally supporting said valve means at the upstream end thereof relative to the lint stream, a sampler press box having a fixed compression surface and a discharge opening adjacent said compression surface, means for separating the charges of withdrawn line cotton from vehicle air and transferring the lint cotton to said press box, means for actuating said valve to withdraw a selected number of charges of line cotton from the lint stream during ginning of one bale, tramper means movable reciprocatively in said press box relative to said compression surface to compress each withdrawn charge of lint cotton to separable charge density against said compression surface and to compress the aggregate sample charges representing one bale in the press box into an elongated mass of substantially bale density aligned longitudinally with said discharge opening and having a height substantially equal to the height of the discharge opening, means for supporting a wrapper sleeve externally of said press box in alignment with a selected axis of said mass of accumulated sample charges, discharge means operative in timed relation to said tramper means for forcing said mass of accumulated sample charges through said discharge opening and into said wrapper sleeve, said tramper means including a rectangular tramper plate movable within said press box in parallelism with said compression surface, hydraulic cylinder means for forcing said tramper plate through a total stroke moving the tramper plate through said press box including a first hydraulic cylinder for driving said tramper plate through a first stroke segment of selected distance corresponidng to the height of the discharge opening and a second cylinder arranged in series relation to said first cylinder for driving said tramper plate through a second stroke segment forming the complement of said first stroke segment relative to said total stroke following actuation of said first cylinder, and means for reversely actuating said first cylinder independently of said second cylinder to withdraw said tramper plate through said first stroke segment to align the bottom of the tramper plate with the top of the discharge opening.

11. In apparatus for sampling fibrous material during the processing of the same, the combination recited in claim 1 wherein said press box includes a planar compression surface against which the charges are tramped, and said tramper means includes an elongated tramper plate having a planar working surface normally urged to a condition of parallelism with said compression surface, said discharge means having a discharge block movable along an axis paralleling said compression surface between positions adjacent opposite ends of said tramper plate, tramper locking means for locking a selected end of said tramper plate against displacement relative to said press box in timed relation to displacement of said discharge block from said selected end of said tramper plate.

12. The combination recited in claim 6 wherein said press box comprises a rectangular chamber including a vertical side wall disposed perpendicular to said compression surface, said charging chamber extends generally perpendicular to the axis of movement of said tramper means and opens through said side wall between said compression surface and said tramper means when the latter occupies said retracted position, and said member for expelling charges from said charging chamber comprises a rectilinearly reciprocative piston plate movable in parallelism with said side wall along an axis perpendicular thereto from a retracted position within said charging chamber and remote from said press box to a projected position aligned with said side wall.

13. The combination recited in claim 6 wherein said press box comprises a rectangular chamber including a side wall disposed perpendicular to said compression surface, said charging chamber extends laterally of the axis of reciprocation of said tramper means and opens through said side wall between said compression surface and said tramper means when the latter occupies said retracted position, and said member for expelling charges from said charging chamber comprises a wall of said charging chamber pivotally supported adjacent one edge thereof along an axis lying immediately adjacent said side wall and extending away from said side wall to a free edge disposed remote therefrom, the pivotally supported wall of said charging chamber being shiftable through an arc to a position substantially paralleling said side wall and lying immediately adjacent thereto to force the cotton charges in said charging chamber through said opening and into said press box, and said charging chamber having a fixed, cylindrically curved wall disposed opposite said pivotally supported wall and extending along a cylindrical path lying immediately adjacent the path swept by the free edge of said pivotally supported wall.

14. Apparatus for sampling lint cotton during the ginning of the cotton to provide a sample composed of a plurality of charges of lint withdrawn from the ginning system at selected intervals during the ginning of a bale representing plural level sections of the bale contents, comprising valve means for periodically withdrawing a charge of the aggregate lint cotton output of the battery of gin stands from the cotton ginning system, a sampler press box having a discharge opening therein and a compression wall adjacent said opening and parallel to the axis thereof, means for transferring the charges of cotton withdrawn by said valve to said press box, tramper means including a tramper plate movable reciprocatively in said press box along an axis perpendicular to said compression wall from a retracted position remote therefrom to a projected position adjacent said wall to compress each charge of lint cotton withdrawn during one opening of said valve means to separable charged density means for actuating said valve means to withdraw a selected number of charges at selected periodic intervals during the ginning of a bale, means for forcing said tramper means to said projected position to compress the accumulated sample charges in the press box representing a single bale into a mass of substantially bale density aligned with said discharge opening, means for supporting a sample retaining wrapper externally of said press box in alignment with a selected axis of the accumulated sample charges tramped to substantially bale density, discharge means operative in timed relation to said tramper means while the latter occupies said projected position for forcing said accumulated sample charges through said discharge opening into said retaining wrapper, and means operated in timed relation to said tramper means to measure and indicate selected measurable properties of the cotton forming each mass of tramped accumulated cotton charges while said tramper plate is in projected position prior to actuation of said discharge means to force said accumulated charges through said discharge opening.

15. Apparatus for sampling lint cotton during the ginning of the cotton to provide a sample composed of a plurality of charges of lint withdrawn from the ginning system at selected intervals during the ginning of a bale representing plural level sections of the bale contents, comprising valve means for periodically withdrawing a charge of the aggregate lint cotton output of a battery of gin stands from the cotton ginning system, a sampler press box having a discharge opening therein and a compression wall adjacent said opening and parallel to the axis thereof, means for transferring the charges of cotton withdrawn by said valve to said press box, tramper means including a tramper plate movable reciprocatively in said press box along an axis perpendicular to said compression wall from a retracted position remote therefrom to a projected position adjacent said wall to compress each charge of lint cotton withdrawn during one opening of said valve means to separable charged density, means for actuating said valve means to withdraw a selected number of charges at selected periodic intervals during the ginning of a bale, means for forcing said tramper means to said projected position to compress the accumulated sample charges in the press box representing a single bale into a mass of substantially bale density aligned with said discharge opening, means for supporting a sample retaining wrapper externally of said press box in alignment with a selected axis of the accumulated sample charges tramped to substantially bale density, discharge means operative in timed relation to said tramper means while the latter occupies said projected position for forcing said accumulated sample charges through said discharge opening into said retaining wrapper, means communicating with said press box for measuring and indicating bulk air flow fineness readings of the cotton forming the mass of tramped accumulated cotton charges in said press box, and means for operating said means to measure and indicate said fineness readings of each mass of tramped accumulated cotton charges while said tramper plate is in projected position prior to actuation of said discharge means to force said accumulated charges through said discharge opening.

16. Apparatus for sampling lint cotton during the ginning of the cotton to provide a sample composed of a plurality of charges of lint withdrawn from the ginning system at selected intervals during the ginning of a bale representing plural level sections of the bale contents, comprising valve means for periodically withdrawing a charge of the aggregate lint cotton output of a battery of gin stands from the cotton ginning system, a sampler press box having a discharge opening therein and a compression wall adjacent said opening and parallel to the axis thereof, means for transferring the charges of cotton withdrawn by said valve to said press box, tramper means including a tramper plate movable reciprocatively in said press box along an axis perpendicular to said compression wall from a retracted position remote therefrom to a projected position adjacent said wall to compress each charge of lint cotton withdrawn during one opening of said valve means to separable charged density, means for actuating said valve means to withdraw a selected number of charges at selected periodic intervals during the ginning of a bale, means for forcing said tramper means to said projected position to compress the accumulated sample charges in the press box representing a single bale into a mass of substantially bale density aligned with said discharge opening, means for supporting a sample retaining wrapper externally of said press box in alignment with a selected axis of the accumulated sample charges tramped to substantially bale density, discharge means operative in timed relation to said tramper means while the latter occupies said projected position for forcing said accumulated sample charges through said discharge opening to said retaining wrapper and means for measuring and indicating the percentage moisture content of the cotton forming each mass of tramped accumulated cotton charges in said press box while said tramper plate is in projected position prior to actuation of said discharge means to force said accumulated charges through said discharge opening.

17. In apparatus for sampling lint cotton, the combination recited in claim 3 including differential pressure switch means responsive to the thickness of the bat of lint cotton formed by said sampler condenser for closing said valve means when a selected bat thickness is attained to automatically regulate the open time of the valve means.

18. In apparatus for sampling lint cotton, the combination recited in claim 6 including differential pressure switch means responsive to the thickness of the bat of lint cotton formed by said sampler condenser for closing said valve means when a selected bat thickness is attained to automatically regulate the open time of the valve means.

References Cited in the file of this patent

UNITED STATES PATENTS

| 253,719 | Kirkpatrick | Feb. 14, 1882 |
| 313,627 | Selz | Mar. 10, 1885 |
| 2,320,544 | Gaus et al. | June 1, 1943 |

OTHER REFERENCES

A publication by the U.S. Dept. of Agriculture entitled "Automatic Mechanical Equipment for Sampling Cotton Bales During Ginning," March 1951.